United States Patent
Cherkaoui et al.

(10) Patent No.: US 9,772,966 B2
(45) Date of Patent: Sep. 26, 2017

(54) CIRCUIT ARRANGEMENT FOR UNIVERSAL CONNECTION OF A BUS PARTICIPANT TO AT LEAST ONE BUS

(71) Applicant: dSPACE digital signal processing and control engineering GmbH, Paderborn (DE)

(72) Inventors: Abdallah Cherkaoui, Borchen (DE); Christian Dierkes, Paderborn (DE); Lars Kopka, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 554 days.

(21) Appl. No.: 14/161,064

(22) Filed: Jan. 22, 2014

(65) Prior Publication Data

US 2014/0207994 A1  Jul. 24, 2014

(30) Foreign Application Priority Data

Jan. 22, 2013 (DE) .......... 10 2013 100 603

(51) Int. Cl.
*G06F 13/24* (2006.01)
*G06F 13/40* (2006.01)
(Continued)

(52) U.S. Cl.
CPC .... *G06F 13/4022* (2013.01); *H04L 12/40032* (2013.01); *H04L 12/40169* (2013.01); *H04L 12/42* (2013.01)

(58) Field of Classification Search
None
See application file for complete search history.

(56) References Cited

U.S. PATENT DOCUMENTS

2002/0167899 A1* 11/2002 Thompson ............ H04L 12/437
370/222
2005/0111372 A1* 5/2005 Koestner ................... H04L 1/22
370/248

(Continued)

FOREIGN PATENT DOCUMENTS

EP 2 001 169 A1 12/2008

OTHER PUBLICATIONS

German Office Action for German Application No. 10 2013 100 603.5 dated Sep. 25, 2013 with English translation.

(Continued)

*Primary Examiner* — Elias Mamo
(74) *Attorney, Agent, or Firm* — Muncy, Geissler, Olds & Lowe, P.C.

(57) ABSTRACT

A circuit arrangement for connecting a bus participant to at least one bus, having an interface for connecting the bus participant to the circuit arrangement, a first bus input, and a first bus output between which the bus participant is switchable via the interface. The circuit arrangement includes a second bus input and output for connecting the bus to the circuit arrangement in a ring topology in such a way that the first bus output is connected at least indirectly to the second bus input and the second bus output is connected at least indirectly to the first bus input via the bus. The bus in the circuit arrangement can be separated to obtain a line topology and can be configured as bus-terminating at one of the bus inputs or bus outputs. A system for the functional testing of bus participants on a bus in a simulation environment is provided.

23 Claims, 11 Drawing Sheets

(51) Int. Cl.
*H04L 12/40* (2006.01)
*H04L 12/42* (2006.01)

(56) References Cited

U.S. PATENT DOCUMENTS

| | | | | |
|---|---|---|---|---|
| 2005/0226265 A1* | 10/2005 | Takatori | ............. | H04Q 11/0478 370/452 |
| 2005/0271044 A1* | 12/2005 | Hsu | ......................... | H04L 12/40 370/360 |
| 2006/0136604 A1* | 6/2006 | Schultze | ................. | H04L 12/24 709/251 |
| 2007/0070919 A1* | 3/2007 | Tanaka | ................. | H04L 12/2602 370/254 |
| 2012/0130512 A1* | 5/2012 | Song | .................... | G05B 19/054 700/86 |
| 2012/0188869 A1* | 7/2012 | Lee | ......................... | H04L 12/42 370/228 |

OTHER PUBLICATIONS

Janssen et al., "Ether-CAT—The Ethernet-field bus," Electronics, vol. 23, pp. 64-72 and vol. 25, pp. 62-67 (2003) with English translation.
Waeltermann et al., "Hardware-in-the-Loop Testing of Distributed Electronic Systems," ATZ (Automobile Technical Magazine), vol. 4, pp. 416-425 (2004) with English translation.
dSPACE, "Hardware documentation of DS294-01 board (CAN-Matrix)," pp. 1-13 (Apr. 2001).

* cited by examiner

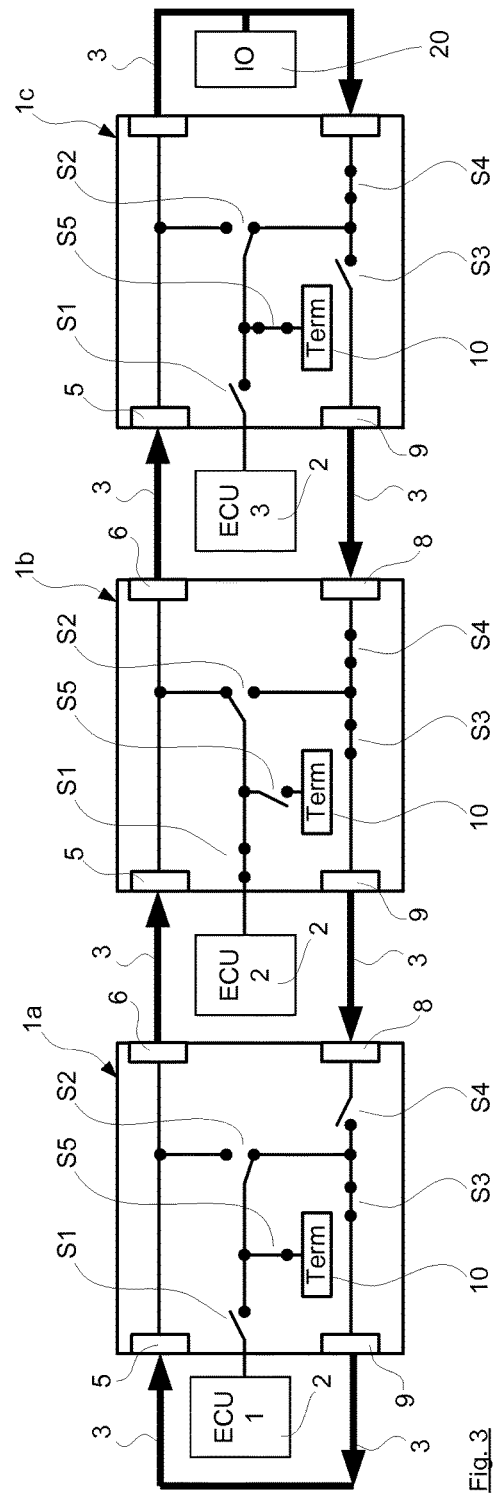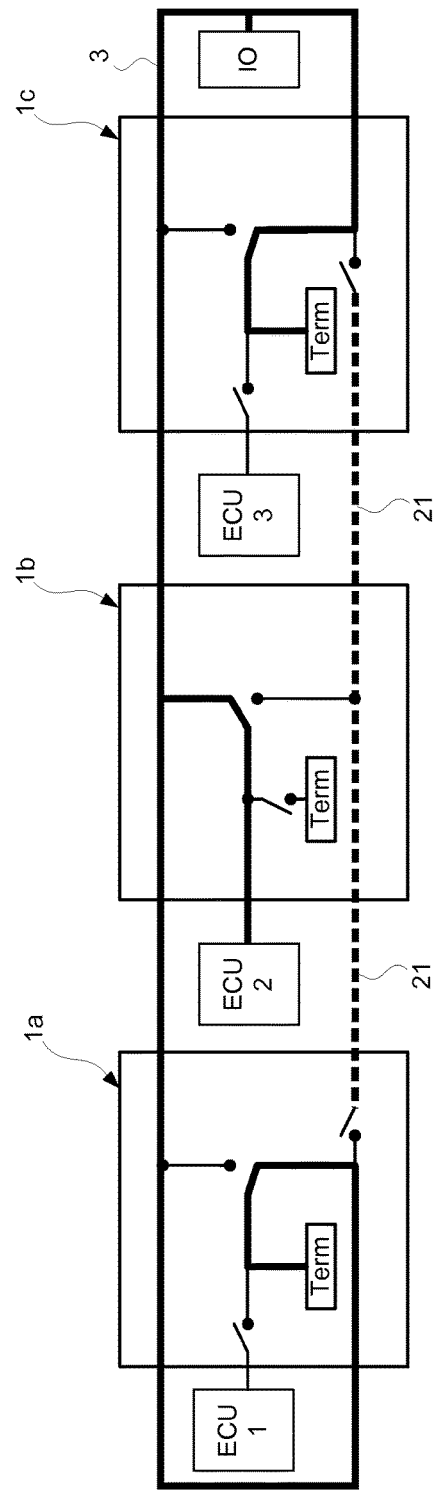
Fig. 3
Fig. 4

CIRCUIT ARRANGEMENT FOR UNIVERSAL CONNECTION OF A BUS PARTICIPANT TO AT LEAST ONE BUS

This nonprovisional application claims priority under 35 U.S.C. §119(a) to German Patent Application No. DE 10 2013 100 603.5, which was filed in Germany on Jan. 22, 2013, and which is herein incorporated by reference.

BACKGROUND OF THE INVENTION

Field of the Invention

The present invention relates to a circuit arrangement for connecting a bus participant to at least one bus, particularly a CAN bus, having an interface for connecting the bus participant to the circuit arrangement, a first bus input, and a first bus output, between which the bus participant is switchable via the interface. Furthermore, the invention relates to a bus participant, particularly an electronic control device for motor vehicles, having such an integrated circuit arrangement. Further, the invention relates to a system for the functional testing of bus participants on a bus in a simulation environment comprising a plurality of circuit arrangements and a bus, particularly a CAN bus, whereby the bus participants can each be connected to the bus by means of one of the circuit arrangements, and further comprising a simulator unit for simulating control signals on the bus.

Description of the Background Art

In general, the invention relates to the technical field of the functional testing of one or more electronic control devices by means of a simulation environment, which is generally called "hardware in the loop" (HIL). In this regard, the electronic control device represents an embedded system, which is connected with its inputs and outputs to a simulator unit, which reproduces the real environment of the system, i.e., the electronic control device(s). The functional testing comprises in particular the testing of functions and of the error behavior of the control devices. It is used for support during the development of hardware and software for the devices.

The HIL method is particularly widespread in the automotive sector. In this regard, the system to be controlled, i.e., the vehicle, is simulated via models in order to check the correct functioning of the control device to be developed, for example, an engine control device. The control device can be any electronic, mechatronic, or magnetic actuator and/or sensor system, which is used, for example, for activating an electric motor or actuating a magnetic valve. The simulation as a rule runs in real time. The inputs of a control unit are supplied with sensor data from the model, and the output signals generated at the output of the control unit in response to the input signals are returned to the model, so that there is a closed control loop (loop).

To test the functionality and operability of individual or a plurality of control devices, according to the conventional art these are connected to a specific bus, e.g., a main bus or a local bus, by suitable cabling. This leads to a very inflexible test setup, however. A change in the bus structure is possible only with considerable effort; in particular switching from the main bus to the local bus must occur by changing the cabling.

In the past, so-called matrix boards were used which provide connections for a plurality of buses and a plurality of control devices. The bus lines and the control device lines cross in the manner of a matrix, whereby at each intersection point a connection can be made between the particular bus and the particular control device line, so that each control device can be connected optionally to one of the buses. The disadvantage of such a matrix board is that only a limited number of control devices or bus participants can be connected.

SUMMARY OF THE INVENTION

It is therefore an object of the present invention to provide a possibility of achieving a high flexibility in the design of the bus structure, particularly with respect to the selection of the bus termination point, and a high flexibility in the number and interconnection of the bus participants to a specific bus, whereby the amount of work and cabling are to be kept low and at the same time a change in bus structure and switching from one bus to another is to be made possible during the HIL simulator operation.

According to an embodiment of the invention, a circuit arrangement is provided for connecting a bus participant to at least one bus, particularly a CAN bus, having an interface for connecting the bus participant to the circuit arrangement, a first bus input, and a first bus output, between which the bus participant is switchable via the interface, whereby the circuit arrangement comprises a second bus input and a second bus output for connecting the bus to the circuit arrangement in a ring topology in such a way that the first bus output is connected at least indirectly to the second bus input via the bus and the second bus output is connected at least indirectly to the first bus input via the bus, and whereby the bus in the circuit arrangement can be separated to obtain a line topology, and the circuit arrangement can be configured as bus-terminating at one of the bus inputs or bus outputs.

Such a circuit arrangement connects the bus participant to the bus in the manner of a gateway module. An aspect of the invention is that the second bus input and bus output are provided not for the connection of a second bus but for the same bus, which in terms of circuitry runs first to another identical circuit arrangement and then again returns from it. The bus therefore is or can be routed twice through the circuit arrangement. Due to this connectability of the circuit arrangement in the form of a ring topology, any number of bus participants can be embedded in an HIL simulation environment and tested individually or together.

A further aspect of the invention is that the circuit arrangement of the invention can be configured so that it terminates one of the bus inputs or bus outputs. This is of advantage, when the bus participant has no integrated termination and it or the circuit arrangement is to be connected to a bus end.

Each circuit arrangement can connect the bus participant connected to it to the bus or disconnect it from the bus and route through or disconnect the bus line both between the first bus input and first bus output and between the second bus input and second bus output. It thereby enables a flexible change in the bus structure to the effect that in each circuit arrangement the bus can be disconnected and connected as terminating to the open position arising thereby.

In a hardware simulation environment with a plurality of bus participants of different variants, these can then be tested during the HIL simulation. Any circuit arrangement can connect a bus participant to the bus, alternatively loop through the bus, and optionally terminate the bus.

According to an embodiment, the interface can be connected via a first switch group optionally to the first bus input and the first bus output or to the second bus input and the second bus output, and the connection from the first switch group to the second bus input and to the second bus output can be severed in each case by a disconnect switch group in order to change the ring topology of the bus to a line topology. The circuit arrangement in this embodiment variant therefore then has a first disconnect switch group in order to sever the connection between the second bus output and the first switch group, and a second disconnect switch group in order to sever the connection between the second bus input and the first switch group.

The two disconnect switch groups can be switchable independently of one another. If the second disconnect switch group is closed, there is a connection between the second bus input to the first switch group. If the first disconnect switch group is closed, there is a connection between the second bus output to the first switch group. If both disconnect switch groups are closed, it follows that there is a connection between the second bus input and the second bus output. If one of the disconnect switch groups is actuated, i.e., the connection is opened, while the other disconnect switch group remains closed, there is an open end of the bus at the first switch group, provided the bus participant is not or will not be connected to this end via the first switch group.

The open bus end, arising due to the disconnection, is to be closed electrically to avoid reflections and not to influence the bus communication. To this end, the circuit arrangement may have a bus termination unit, particularly a termination resistor, which, depending on the position of the switch of the disconnect switch group, can be connected to the second bus input and/or the second bus output via at least one termination switch. The termination switch switches the termination unit on or off. If the second disconnect switch group is opened and the termination unit turned on, this is referred to below as a left-sided termination. If the first disconnect switch group is opened and the termination unit is turned on, this is accordingly referred to below as a right-sided termination.

It should be noted that the bus participant itself to be connected to the bus can also already have a termination unit. The termination in the circuit unit according to the invention however offers a high flexibility with respect to the connection options of the bus participant, without having to perform a change in cabling thereby. Thus, the termination unit of the circuit arrangement can be used both for terminating the bus, when the terminating bus participant is disconnected, and also for bus participants that have no integrated termination. This can be the case, for example, with bus participants that are still in an early development phase, or it can be the case with bus participants that are actually intended for an arrangement in the middle of the bus, but for testing purposes are to be connected to another bus as an end device. The circuit-integrated termination unit also offers the advantage that the position of a bus participant on the bus can be changed, without having to recable the bus participant or to manually produce a termination for this purpose. Such a change in position is interesting in particular for bus participants from different development stages. This offers great advantages, because the bus participant that terminates need not be clear at the time of the cabling.

An open end of the bus at disconnecting disconnect switch group also arises by opening a disconnect switch group. This end need not terminate, however, when the bus incoming there was already "dead-ended" by another circuit arrangement; i.e., a disconnection at the complementary disconnect switch group of another circuit arrangement has occurred, which according to the ring topology is connected to the bus before the aforementioned circuit arrangement. Therefore, the entire bus structure is then such that a circuit arrangement is to be configured as right-terminating at the bus and another circuit arrangement as left-terminating at the bus. The bus line section, which is between a left-terminating circuit arrangement and a right-terminating circuit arrangement, can therefore be "dead-ended" in this manner.

The terms "switch group" and "disconnect switch group" can comprise here and hereafter a group of two or more switches that fulfill the same function and therefore are switched substantially simultaneously. The terms take into account the fact that in the case of bus communication within the circuit unit a distinction is to be made in regard to the direction (in/out) and that appropriate switches are to be provided for each signal path in multi-wire bus systems, particularly in bus systems that use differential signals with complementary signal levels in the lines, as is the case in a CAN bus (Controller Area Network) according to ISO 11898.

The termination unit can be disposed at a node between the interface and the first switch group. This achieves that, depending on the position of the first switch group, the unit can be connected to the first bus input or the second bus input and second bus output. Alternatively, therefore, the first bus input as well can be configured as terminating in the circuit arrangement.

The disconnect switch groups in each case can have double-throw switches, whereby they connect the second bus input and/or the second bus output optionally to the first switch group or to a bypass line. The second bus input and the second bus output can also be connected directly to one another via the bypass line. It is achieved thereby that the line leading to the first switch group is bridged by means of the bypass line when both disconnect switch groups are connected to the bypass line. The line would mean a "dead end" in terms of communication technology, at whose ends reflections could arise. The development of reflections at the open end of the line is prevented by the switching of the connection between the second bus input and second bus output to the bypass line.

It should be noted that in multi-wire wiring of the bus, accordingly as many bypass lines as wires can be provided.

According to an embodiment, the circuit arrangement may have a bridging switch group for direct connection of the first bus input to the first bus output. A direct connection in this sense is taken to mean that the bus is routed through from the first bus input to the first bus output and is not looped over the bus participant. The bridging switch group accordingly bridges the first switch group. This has the advantage that the bus participant during operation can be disconnected from the bus, without the bus communication being interrupted.

The bridging switch group as well can include a plurality of switches, provided that the bus is realized as multi-wire, whereby a bridging switch can then be provided for each wire, i.e., for each signal path. The bridging switches need not be switchable simultaneously here however. Rather, it is advantageous for individual connection variants to have the bridging switches of a bridging switch group switchable separately from one another.

In addition or alternatively to the aforementioned features, the circuit arrangement may have an activation switch group, by which the interface can be connected to the first switch group. The activation switch group is used for coupling and decoupling the bus participant to or from the bus, respectively. The bus participant can be turned on (enabled) and turned off (disabled) thereby.

The activation switch group can also have a plurality of switches. Thus, particularly an activation switch for the signal input, i.e., the signal path coming from the first bus input, and an activation switch for the signal output, i.e., signal path going to the first bus output, can be provided, which together form a switch pair.

Provided the bus is realized as multi-wire, the activation switch group can have a switch pair for each line of the bus. This embodiment variant is suitable particularly for dual-wire CAN buses, which use differential bus signals and use a bus line for high (H) and a bus line for low (L). The switch pairs can be switchable separately from one another. This has the advantage that the transceiver modes of the bus participants can be tested individually, and the emergency modes can be tested if one line has an interruption or a short circuit.

Each switch pair of the activation switch group in turn can have a switch for the incoming signal path (in) and the outgoing signal path (out) in regard to the bus participant. As a total, the activation switch group then comprises four switches. The switches of a particular activation switch pair can be activated together and accordingly switch simultaneously.

The first switch group can comprise a plurality of double-throw switches. Optionally a connection of the interface or of the bus participant to the first bus input and bus output and a connection to the second bus input and bus output can be made by means of the double-throw switches. In particular, one double-throw switch each can be provided for the signal path coming from the first bus input (in) and for the signal path going to the first bus output (out). Here as well, these double-throw switches can form a switch pair, which are activated together.

Provided the bus is realized as multi-wire, there can be such a switch pair for the incoming and outgoing signal path (in, out) for each bus line H, L. All switch pairs of the first switch group can be switched together simultaneously. This has the advantage that in the end only a single driver circuit is necessary for actuating all switches of the first switch group.

The merging into jointly switched switch pairs or switch groups in the case of all switches has the advantage of reducing the activation cost due to fewer control signals and of reducing the number of driver circuits, so that both a saving of space from a structural viewpoint and also cost saving due to fewer required components are achieved as a result.

According to an embodiment, the circuit arrangement may have further connections for connecting to a second bus, particularly a second CAN bus, and comprise a bus changeover switch group, by means of which the interface can be connected optionally to the first bus or to the second bus. It can be established therefore by the bus changeover group whether the bus participant communicates at the first bus or at the second bus.

It is advantageous if the bus changeover switch group in terms of circuitry is arranged between the interface and the first switch group. This reduces the number of switches needed for the bus changeover switch group, and the circuit layout of the circuit arrangement becomes simpler.

The bus changeover switch group can be formed by double-throw switches, which can switch back and forth between the first bus and the second bus. In so doing, the bus changeover switch may comprise a plurality of double-throw switches. A connection of the interface or of the bus participant can be made optionally to the first bus or to the second bus by means of these double-throw switches. This means that either a connection of the interface can be made to the first bus input and bus output of the first bus or, depending on the position of the first switch pair, to the second bus input and bus output of the first bus, or that a connection of the interface can be made to the first bus input and bus output of the second bus or, depending on the position of a second switch pair, to the second bus input and bus output of the second bus.

In particular, one double-throw switch each can be provided for the signal path going to the interface (in) and for the signal path coming from the interface (out). Here as well, these double-throw switches can be combined into a switch pair, whereby the double-throw switches can be activated together.

Provided that both buses are realized as multi-wire, there can be such a switch pair for the signal path coming from the interface and going to it for each bus line (H, L). All switch pairs of the first switch group can be switched together simultaneously. This has the advantage here as well that only a single driver circuit is required for actuating all switches of the bus changeover switch group.

The circuit arrangement, as already addressed above, can also have a first bus input, a first bus output, a second bus input, and a second bus output for the second bus in such a way that the second bus can also be placed in a ring topology in such a way that the first bus output is connected at least indirectly to the second bus input via the second bus and the second bus output is connected at least indirectly to the first bus input via the second bus. This provides maximum flexibility with respect to the bus structure of the second bus, the connection of the bus participant, and also with respect to the type of connection as bus-terminating or not bus-terminating is also achieved thereby for the second bus.

As likewise already addressed, the circuit arrangement in the embodiment variant with a connection option to a second bus may comprise a second switch group, by means of which the interface in the bus changeover switch group position selecting the second bus can be connected optionally to the first bus input and first bus output of the second bus or to the second bus input and second bus output of the second bus. The second switch group, because of its identical purpose and same functionality as the first switch group, can be constructed identical to it.

As in the case of the internal interconnection of the signal paths coming from the first bus (in) or going to the bus (out), the connection from the second switch group to the second bus input and to the second bus output of the second bus can each be made severable by a disconnect switch group, in order to change the ring topology of the second bus to a line topology. This disconnect switch group can be made identical to the previously described disconnect switch group.

In particular, the two disconnect switch groups for the second bus can each comprise double-throw switches, which connect the second bus input and/or the second bus output of the second bus optionally to the second switch group or to another bypass line. As in the other bypass line, a direct connection between the second bus input and the second bus output of the second bus can be created via the other bypass line, as a result of which the line is bridged from the disconnect switch groups to the second switch group. This also serves to prevent reflections that could occur if the second bus input and the second bus output of the second bus were to be connected to one another via this line to the second switch group.

Is the second bus realized as multi-wire, particularly dual-wire, the disconnect switch groups in each case comprise a double-throw switch for each bus line (H, L). The double-throw switches of a disconnect switch group can be activated simultaneously to keep the number of switch activations low.

The circuit arrangement of the invention may have a second termination unit for the electrical termination of the second bus, which, depending on the position of the mentioned disconnect switch groups, can be connected to the second bus input or the second bus output via at least one termination switch. To this end, the second termination unit can be arranged at a node between the interface and the second switch group in such a way that depending on the position of the second switch group, it can be connected either to the first bus input or the second bus input or to the second bus output of the second bus. This allows for maximum flexibility in the wiring of the circuit arrangement with the second bus and for the corresponding design of the bus structure for the second bus as well.

Provided the second bus is realized as multi-wire, particularly as dual-wire, the second switch group can also comprise a double-throw switch for each wire. This means, for example, for a CAN bus with differential signals H and L, i.e., for a bus with two wires, that the second switch group has four double-throw switches, namely, a double-throw switch pair for each wire, whereby a double-throw switch pair in each case has a double-throw switch for the signal input and for the signal output. Naturally, this can be realized for the first bus as well.

According to an embodiment, the circuit arrangement may also have a bridging switch group for the second bus for direct connection of the first bus input to the first bus output of the second bus. This makes it possible that the second bus also is routed through from the first bus input to the first bus output and need not be looped through via the bus participant. This second bridging switch group accordingly bridges the second switch group and thereby offers the advantage that the bus participants during operation can be disconnected from the second bus, without the bus communication on the second bus being interrupted.

The second bridging switch group as well can include a plurality of switches, provided the second bus is realized as multi-wire, whereby then a bridging switch can be provided for each wire, i.e., for each signal path. The bridging switches here also not need necessarily be simultaneously switchable. Rather, it is advantageous for the individual connection variants of the circuit arrangement to realize the bridging switches of the second bridging switch group as switchable separately from one another.

The termination unit connectable to the first bus and/or the second termination unit connectable to the second bus can be formed by a single termination resistor. In the case of a single bus wire, the termination resistor can then terminate the corresponding bus to ground. Provided the bus, or the first and/or second bus, is/are realized as dual-wire, the termination resistor can connect the first wire to the second wire of the respective bus. In this variant, a single termination switch is sufficient to switch the termination resistor between the two wires of the corresponding bus.

According to an alternative embodiment, the termination unit connectable to the first bus and/or the second termination unit connectable to the second bus can be formed by two termination resistors, which together are connected to ground via a capacitor. This embodiment variant requires two termination switches for a termination unit, i.e., one switch for each wire. In this regard, the one termination resistor is connected to one of the bus wires via a first termination switch and the other termination resistor to the other bus wire via a further termination switch. Basically the termination switches can be switched independently of one another here as well. However, because in any case both termination switches of a termination unit are always to be actuated, it is advisable here as well to switch the termination switches together.

The circuit arrangement can be mounted on a circuit board. In this regard, to realize the first bus input, the first bus output, the second bus input, and the second bus input of the first bus, and to realize the corresponding inputs and outputs for the second bus, corresponding electrical connections, particularly screw-type or plug-in-type connections, are provided on the circuit board. This also applies to interfaces to which the bus participant is to be connected. In the case of a CAN bus with thus two wires per input and output, overall eight connections for the first bus and eight connections for the second bus are therefore provided on the circuit arrangement. Furthermore, the interface is to be provided with four connections.

The individual switches of the switch groups, i.e., the first switch group, the second switch group, the disconnect switch groups, the bus changeover switch group, and the bridging switches and/or the termination switches, can be formed, for example, by relays. In this regard, switch pairs can be switched by a single relay, which is then activated selectively. However, relays can also be interconnected and activated together. Particularly in the case of the first switch group and the second switch group, the particular switch pairs can be activated together in order to reduce the number of relay drivers.

The control lines for activating the individual switches or relays can be routed to a common electrical control connection, particularly a screw-type or plug-in type connection, in order to supply the circuit unit with appropriate control signals for the switches. For example, a ribbon cable, which at its other end can be connected, for example, to a computer, can be connected to the control connection. Alternatively, a microcontroller can be mounted on the board of the circuit arrangement for control. The microcontroller for its part can again be connected to a computer via a configuration bus.

In particular, the board can be placed in a housing, which is designed for top-hat rail mounting. The cabling of the circuit arrangement, particularly with a plurality of devices, can thus occur simply and clearly according to the "quasi-ring topology."

According to an embodiment of the invention, the described circuit arrangement can be part of the bus participant connectable or to be connected to the first or second bus. It can therefore be made structurally integrated with it. For example, the bus participant can be an electronic control device, particularly for motor vehicles and airplanes. However, any other control devices are conceivable that are provided for connection to a CAN bus.

Furthermore, the circuit arrangement together with other, particularly identically configured design arrangements can be part of an entire system for the functional testing of bus participants on a bus in a simulation environment. According to the invention, such a system is therefore also proposed comprising a plurality of circuit arrangements and a bus, particularly a CAN bus, whereby the bus participants can be connected to the bus in each case by means of one of the circuit arrangements, and further comprising a simulator unit for simulating control signals on the bus, whereby each of the circuit arrangements has a first and a second bus input and a first and a second bus output and the bus connects the circuit arrangements in a ring topology in such a way that each first bus output of one of the circuit arrangements is connected either to the first bus input of the next circuit arrangement or to the second bus input of its own circuit arrangement, and each second bus output of one of the circuit arrangements is connected either to the second bus input of the next circuit arrangement or to the first bus input of its own circuit arrangement, whereby the bus in each of the circuit arrangements can be separated to obtain a line topology and each circuit arrangement can be configured as bus-terminating at one of the bus inputs or bus outputs.

In an embodiment, the system can comprise a second bus which connects the circuit arrangements in the same way as the first bus. In this regard, the first bus can represent a main bus and the second bus a local bus for a residual bus simulation.

In the system of the invention, each of the circuit arrangements provided there can be configured as has been previously described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows an example of a first interconnection type of the three circuit arrangements according to FIG. 2;

FIG. 4 shows a schematic diagram of the bus structure of the first example;

DETAILED DESCRIPTION

Figure 1:
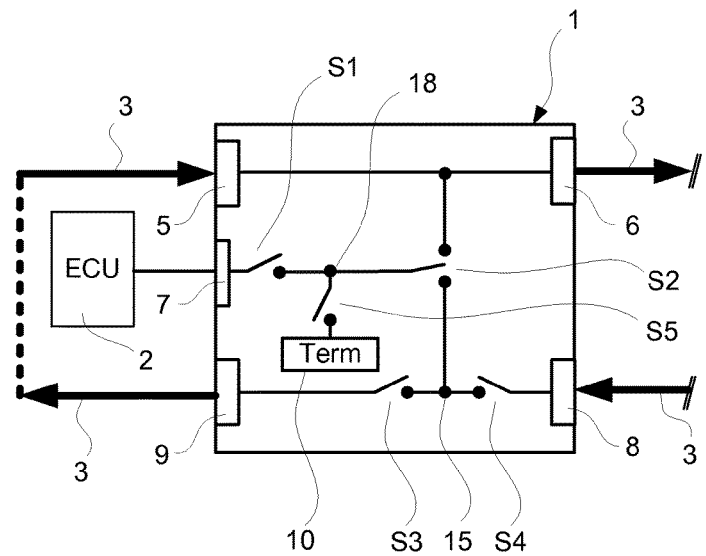
FIG. 1 shows a schematic block diagram of a first circuit arrangement of the invention for connection to only one bus.

FIG. 1 shows the circuit diagram of a first circuit arrangement 1 of the invention in a simplified illustration. This illustration is simplified with respect to the signal directions of the bus communication and with respect to a possible multi-wired nature of the bus.

Circuit arrangement 1 is used to connect a bus participant 2 to a CAN bus 3. Bus participant 2 here is an electronic control unit ECU. Circuit arrangement 1 has an interface 7, via which bus participant 2 can be connected to circuit arrangement 1. Further, it has a first bus input 5 and a first bus output 6, between which bus participant 2 can be switched via interface 7. Further, it has a second bus input 8 and a second bus output 9, so that bus 3 can be connected to circuit arrangement 1 in a ring topology in such a way that first bus output 6 is connected indirectly or directly to second bus input 8 via bus 3 and second bus output 9 is connected indirectly or directly to first bus input 5 via bus 3. Bus 3 in circuit arrangement 1 can be separated to obtain a line topology. Moreover, circuit arrangement 1 can be configured so that it terminates the bus at one of the bus inputs 5, 8 or bus outputs 6, 9, as will be explained further below.

Interface 7 can be connected via a first switch group S2, which for the sake of simplicity is illustrated here only as a single double-throw switch, optionally to first bus input 5 and first bus output 6 (top) or to second bus input 8 and second bus output 9 (bottom). Further, circuit arrangement 1 comprises an activation switch group S1, via which interface 7 can be connected to first switch group S2 for coupling and decoupling of bus participant 2 to or from bus 3, respectively.

Further, in circuit arrangement 1a first and a second disconnect switch group S3, S4 are provided to sever the connection from first switch group S2 to second bus input 8 (see second disconnect switch group S4) and from first switch group S2 to second bus output 9 (see first disconnect switch group S3). For this purpose, first switch group S2 is connected to a node 15 between the two disconnect switch groups S3, S4. Disconnect switch groups S3, S4, likewise for the sake of simplicity, are illustrated here only as a single switch.

Due to the severing of the connection, the other bus connection 8, 9 in each case remains at first switch group S2. Provided there is no integrated termination for the electrical termination of the bus on the part of the bus participant and the bus participant or the circuit arrangement nevertheless are to be connected to a bus end or to form a bus end, a suitable termination outside the bus participant must be provided.

For this purpose, circuit arrangement 1 has an integrated termination unit 10, which can be connected or disconnected via a termination switch S5. In the connected state, termination unit 10 is connected to a node 18 between interface 7 and first switch group S2. This means that depending on the position of first switch group S2, it can be connected either to first bus input 5 and/or first bus output 6, or to second bus input 8 and/or second bus output 9, as can be made clear with FIG. 1. The connection to second bus input 8 and/or second bus output 9 depends on the switch position of disconnect switch groups S3, S4. If first disconnect switch group S3 is open and second disconnect switch group S4 closed, a termination is present at second bus input 8 (in the case of a simultaneously closed termination switch and corresponding position of the first switch group), which is called right-terminating here. If second disconnect switch group S4 is open and first disconnect switch group S3 closed, a termination is present at second bus output 9 (in the case of a simultaneously closed termination switch and corresponding position of the first switch group), which is called left-terminating here.

The especially high flexibility resulting therefrom is made clear with FIGS. 2 to 7.

Figure 2:
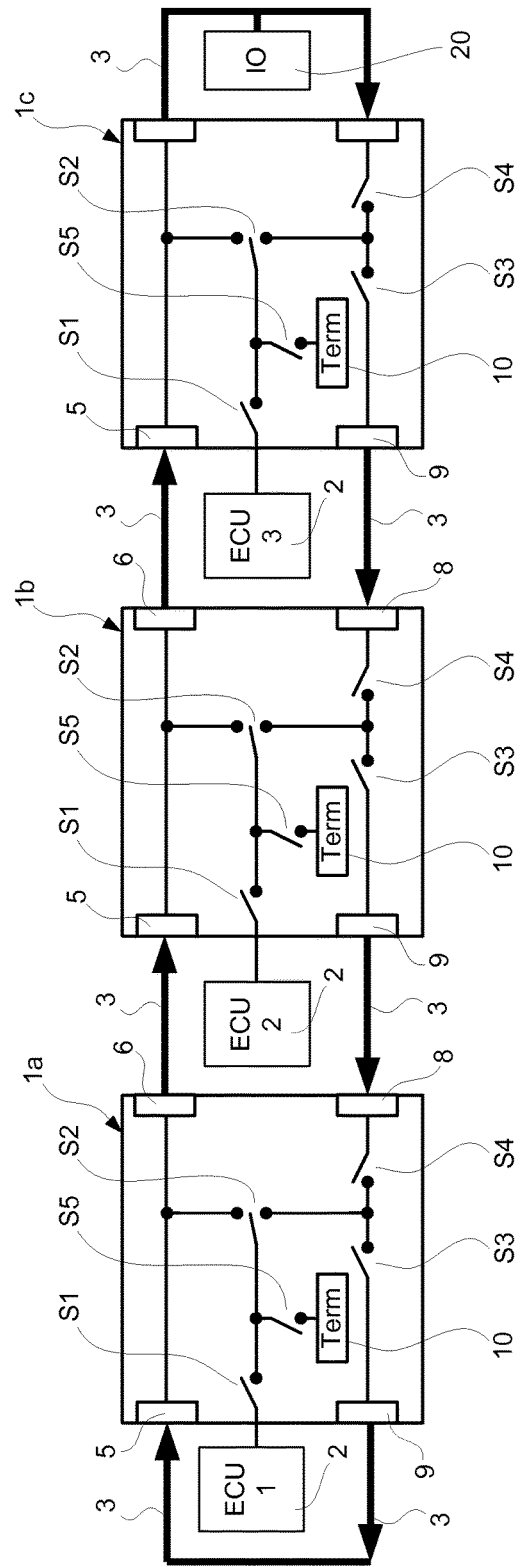
FIG. 2 shows a schematic illustration of the interconnection of three circuit arrangements according to FIG. 1.

FIG. 2 shows the interconnection of three identical circuit arrangements 1a, 1b, 1c according to FIG. 1 by means of the bus in the manner of a ring topology. In this case, first bus output 6 of first circuit arrangement 1a is connected to first bus input 5 of the next second circuit arrangement 1b. Further, second bus output 9 of second circuit arrangement 1b is connected to second bus input 8 of first circuit arrangement 1a, so that therefore there are two bus connections between the first and second circuit arrangements 1a, 1b. In a similar way, first bus output 6 of second circuit arrangement 1b is connected to first bus input 5 of the next third circuit arrangement 1c and second bus output 9 of third circuit arrangement 1c is connected to second bus input 8 of second circuit arrangement 1b, so that here as well there are two bus connections between the second and third circuit arrangements 1b, 1c. In the third circuit arrangement 1c, first bus output 6 is connected via bus 3 to its second bus input 8. This can occur directly or indirectly via an interconnected simulator unit 20, which as a bus participant is also attached to the bus. This occurs in a similar way in the case of first circuit arrangement 1a, whereby here second bus output 9 is connected directly to its first bus input 5 via bus 3. Thus bus 3 is interconnected in the manner of a ring topology to the circuit arrangements.

A bus participant 2, ECU1, ECU2, ECU3, which in each case can be connected to bus 3, is connected at interface 7 of each circuit arrangement 1a, 1b, 1c. The arrangement, illustrated purely schematically and shown in FIG. 2, and the interconnection of circuit arrangements 1a, 1b, 1c can also be selected physically as such. Thus, circuit arrangements 1a, 1b, 1c can be mounted, for example, structurally next to one another on a top-hat rail as in FIG. 2 and wired together. Preferably, circuit arrangements 1a, 1b, 1c can have their bus connections in each case on the side, so that the connections of adjacent circuit arrangements face one another. In this way the bus connections can be kept short.

Different examples are now shown in FIGS. 3 to 7, as to how the individual bus participants can be interconnected with different switch positions of activation switch group S1, termination switch S5, first switch group S2, and disconnect switch groups S3, S4 on bus 3.

In FIG. 3, first circuit arrangement 1a is configured as left-terminating, second circuit arrangement 1b connects its bus participant 2 (ECU2) in the middle to bus 3, and third circuit arrangement 1c is configured as right-terminating.

This means that in the case of first circuit arrangement 1a, first disconnect switch group S3 is closed and first switch group S2 is connected downward (bottom), i.e., is switched to second bus output 9, and second disconnect switch group S4 is open. First bus participant 2, ECU1, has no internal termination, so that termination switch S5 is also closed. Activation switch group S1 is open here.

In the case of second circuit arrangement 1b, first switch group S2 is connected upward (top) and activation switch group S1 is closed, so that second bus participant 2 (ECU2) is switched between first bus input 5 and first bus output 6. Termination switch S5 is open because of the arrangement of the bus participant in the middle of the bus. The position of disconnect switch groups S3, S4 is not important here; in FIG. 3 they are closed by way of example.

Third circuit arrangement 1c is configured substantially identical to first circuit arrangement 1a, whereby here however first disconnect switch group S3 is open and second disconnect switch group S4 is closed in order to realize a right-sided termination.

The bus structure arising due to the appropriate configuration of the individual circuit arrangements 1a, 1b, 1c is emphasized in FIG. 4. It can be seen that the "quasi-ring topology" of bus 3 is separated and there is a dead-ended line section 21, which is shown by the dashed line in FIG. 4, between the first and the third circuit arrangement.

Because of the diverse configurability of circuit arrangements 1a, 1b, 1c, i.e., the many setting options of switch groups S1, S2, S3, S4 and switch S5, a flexible connection of bus participant 2 to bus 3 can occur.

Figure 5:
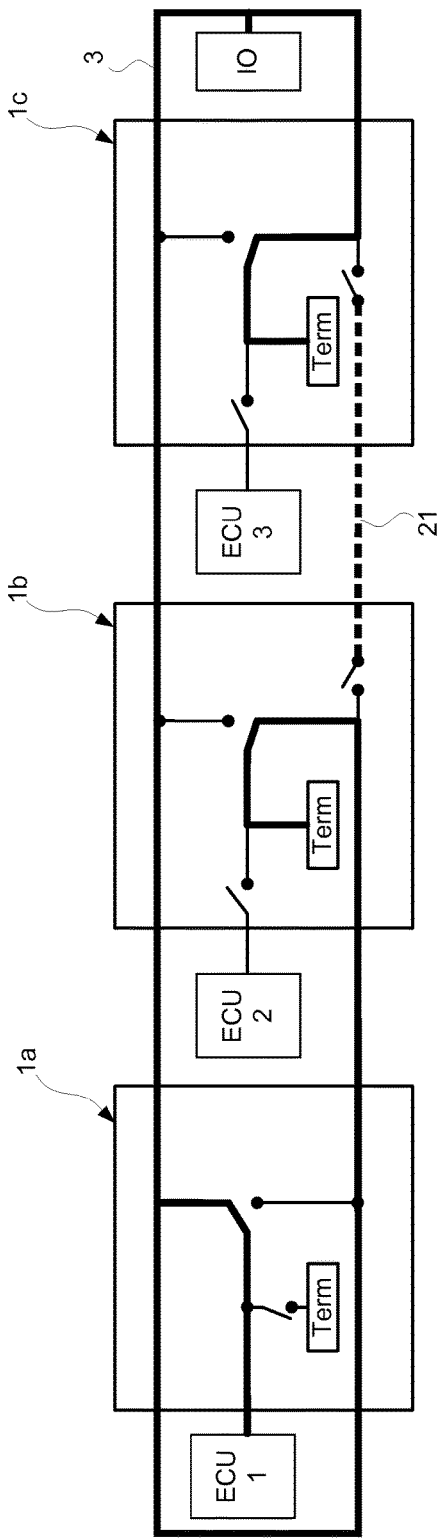
FIG. 5 shows a schematic diagram of the bus structure of a second example.

In FIG. 5, for example, first circuit arrangement 1a is configured so that its bus participant 2, ECU1, is connected in the middle to bus 3. In contrast, second circuit arrangement 1b is configured as left-terminating bus 3 and third circuit arrangement 1c as right-terminating bus 3, so that dead line section 21 now lies between second and third circuit arrangements 1b, 1c.

Figure 6:
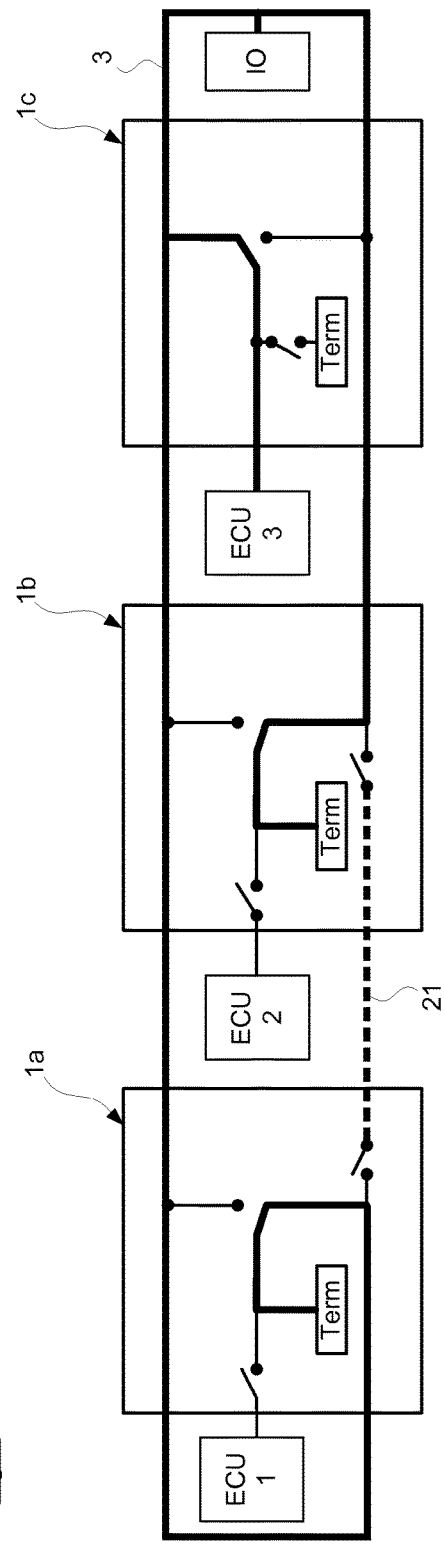
FIG. 6 shows a schematic diagram of the bus structure of a third example.

In FIG. 6, third circuit arrangement 1c is configured so that its bus participant 2, ECU3, is connected in the middle to bus 3. In contrast, first circuit arrangement 1a is configured as left-terminating bus 3 and second circuit arrangement 1b as right-terminating bus 3, so that dead line section 21 now lies between the first and second circuit arrangements 1a, 1b.

Figure 7:
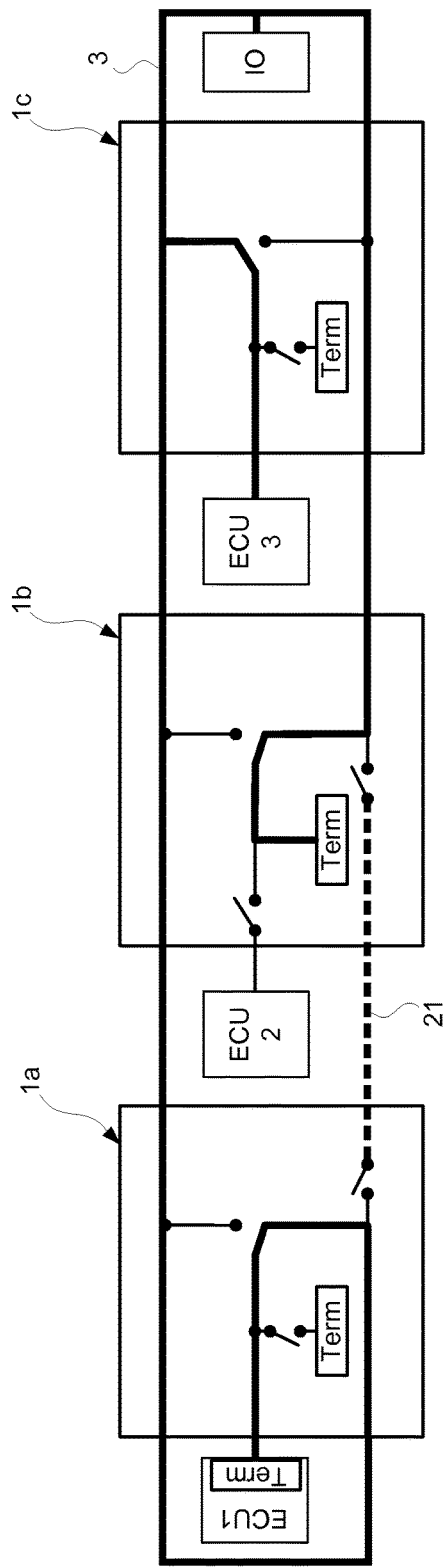
FIG. 7 shows a schematic diagram of the bus structure of a fourth example.

FIG. 7 shows a further example in keeping with the configuration in FIG. 6. Here, bus participant 2 of first switching unit, ECU1, is equipped with an integrated bus termination, so that termination unit 10 of first circuit arrangement 1a does not need to be connected.

Figure 8:
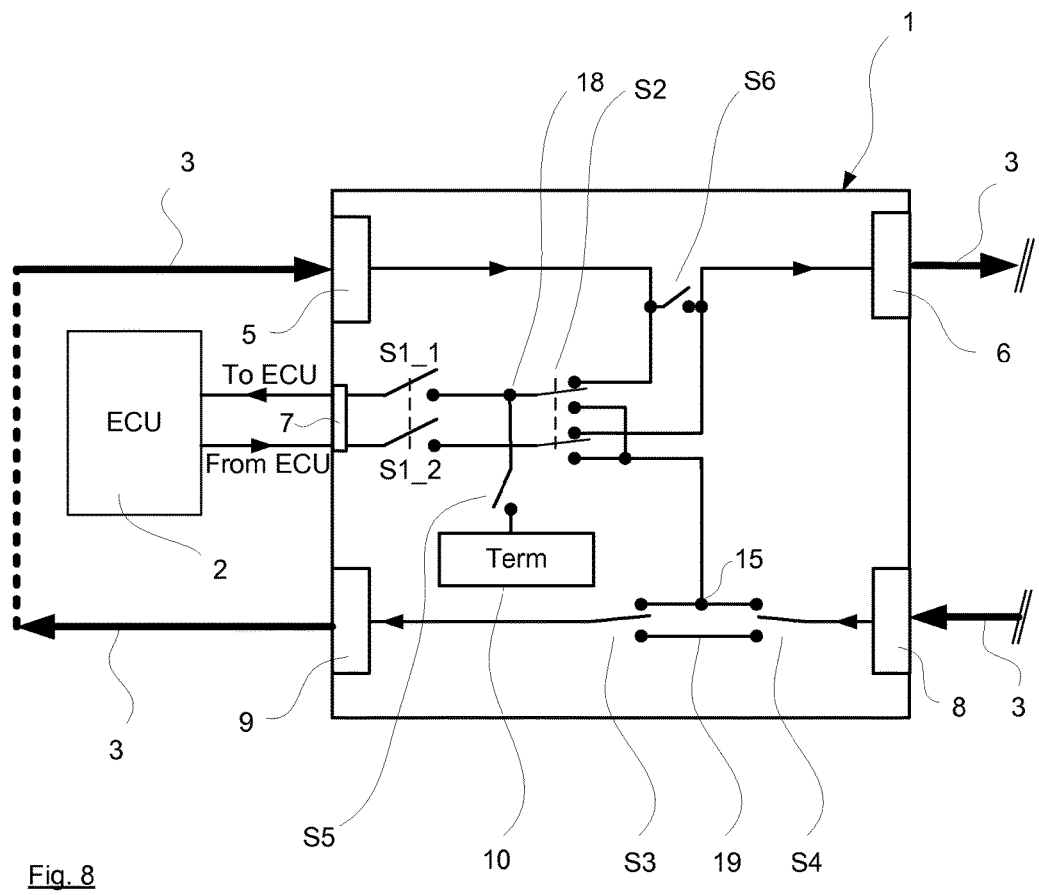
FIG. 8 shows a schematic block diagram of the first circuit arrangement of the invention, defined with respect to the signal input and signal output.

A more precise illustration of the first embodiment variant of circuit arrangement 1 of the invention, which specifies the communication devices from the standpoint of bus 3, is shown in FIG. 8. Thus, it is evident in FIG. 8 that data can be transmitted from first bus input 5 or second bus input 8 to bus participant 2 and from the bus participant to first bus output 6 or second bus output 9. First switch group S2 has two switches for this purpose, of which one switch can connect first bus input 5 to the respective input (to ECU) of bus participant 2 and one switch can connect first bus output 6 to the respective output (from ECU) of bus participant 2. As a result, bus participant 2 can be switched by means of the first switch group between the first bus input and the first bus output, so that the bus communication is looped through the bus participant.

Activation switch group S1 according to the illustration in FIG. 8 comprises in each case one switch S1_1 for the signal path coming from first bus input 5 or one switch S1_2 for the signal path going to first bus output 6.

Moreover, circuit arrangement 1 according to FIG. 8 has a bridging switch group S6. It is used for the direct connection of the first bus input to the first bus output. By closing this bridging switch group S6, bus participant 2 during operation can be removed from the bus without the bus communication having to be interrupted.

A further special feature of circuit arrangement 1 in FIG. 8 is bypass line 19. The first and second disconnect switch groups S3, S4 comprise double-throw switches here, which connect second bus input 8 and second bus output 9 optionally to first switch group S2 or to the bypass line 19. If both disconnect switch groups S3, S4 are switched to bypass line 19, second bus input 8 and second bus output 9 are connected directly to one another and bridge the connection to first switch group S2.

Figure 9:
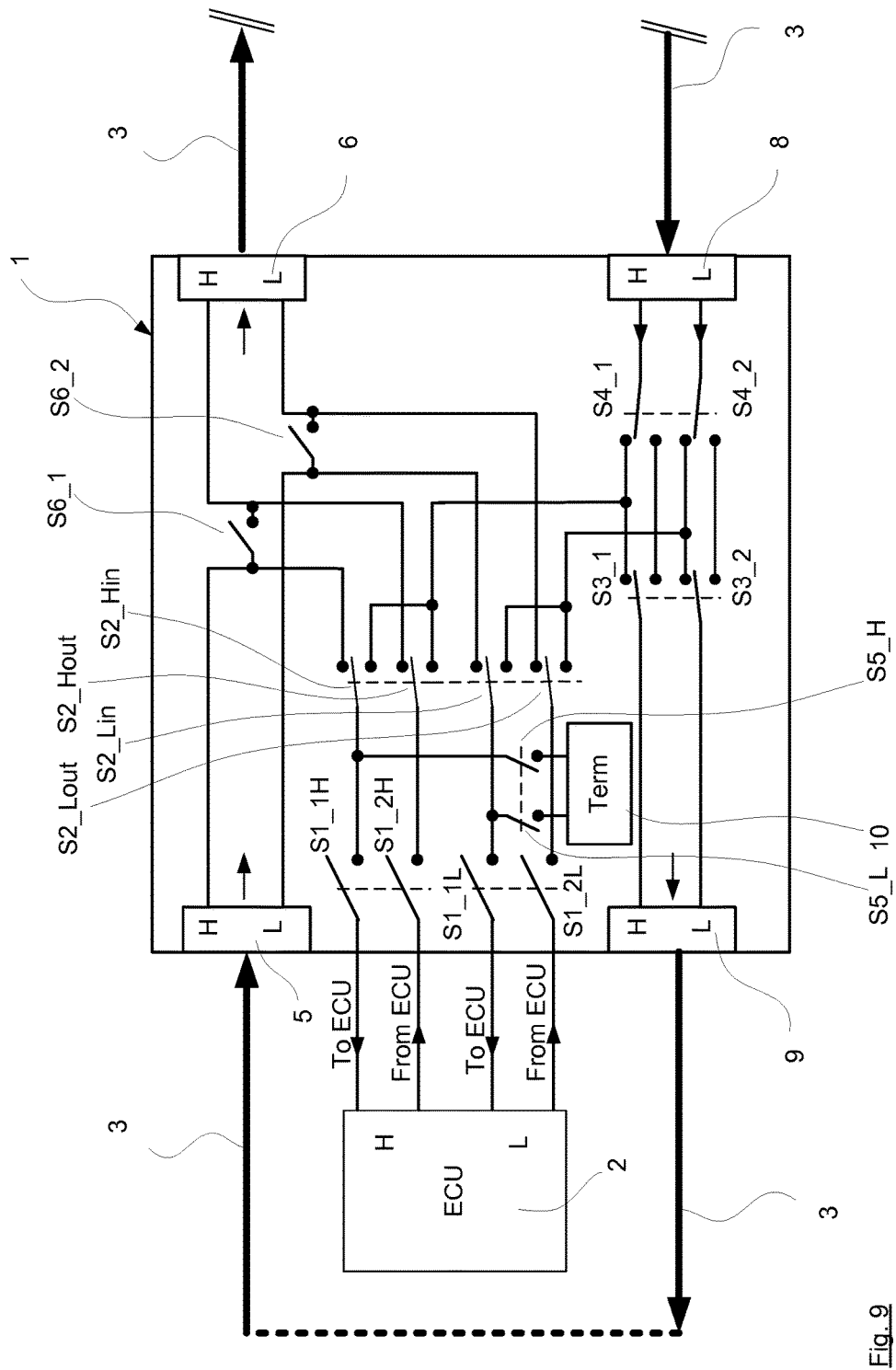
FIG. 9 shows a complete block diagram of the first circuit arrangement of the invention.

A complete electrical block diagram of circuit arrangement 1 of the invention for a CAN bus wiring is shown in FIG. 9. Bus 3 is realized as dual-wire and accordingly has one bus line H (high) and one bus line L (low) carrying the complementary signals. Accordingly, each of the bus connections 5, 6, 8, and 9 has two connections H, L. With consideration of the two signal paths coming into bus participant 2 and leaving it, the participant is connected by means of four lines to circuit arrangement 1. From the standpoint of the bus participant, each of these lines can be connected after interface 7. To this end, activation switch group S1 in each case has a switch pair [S1_1H, S1_2H] and [S1_1L, S1_2L] for each line H, L of bus 3. The switches of each switch pair are switchable together, whereas the switch pairs themselves [S1_1H, S1_2H], [S1_1L, S1_2L] can be switched independently of one another, to be able to test the transmission and communication behavior of the bus participant also in a case of error, for example, in the event of an interruption of a line H, L or in a short circuit of one of the lines H, L.

As is evident from FIG. 9, first switch group S2 also has four double-throw switches S2_Hin, S2_Hout, S2_Lin, S2_Lout. A first double-throw switch S2_Hin connects the signal input for the high signal H at bus participant 2 to the respective bus line at first bus input 5 or second bus input 8. A second double-throw switch S2_Hout connects the signal output for the high signal H at bus participant 2 to the respective bus line at first bus output 6 or second bus output 9. A third double-throw switch S2_Lin connects the signal input for the low signal L at bus participant 2 to the respective bus line at first bus input 5 or second bus input 8. Finally, a fourth double-throw switch S2_Lout connects the signal output for the low signal L at bus participant 2 to the respective bus line at first bus output 6 or second bus output 9. All double-throw switches S2_Hin, S2_Hout, S2_Lin, S2_Lout are switched simultaneously.

The bridging switch group S6 also has one bridging switch S6_1, S6_2 per line, which moreover can be switched independently of one another, so that each bus line H, L can be either looped through between first bus input 5 and first bus output 6 or routed to bus participant 2.

In the case of disconnect switch groups S3, S4 as well, a switch, here particularly a double-throw switch, is provided for each bus line H, L, so that both first disconnect switch group S3 has two double-throw switches S3_1, S3_2, and second disconnect switch group S4 also has two double-throw switches S4_1, S4_2. Double-throw switches [S3_1, S3_2], [S4_1, S4_2] of a disconnect switch group S3, S4 are switched together in each case.

Figures 10, 11:
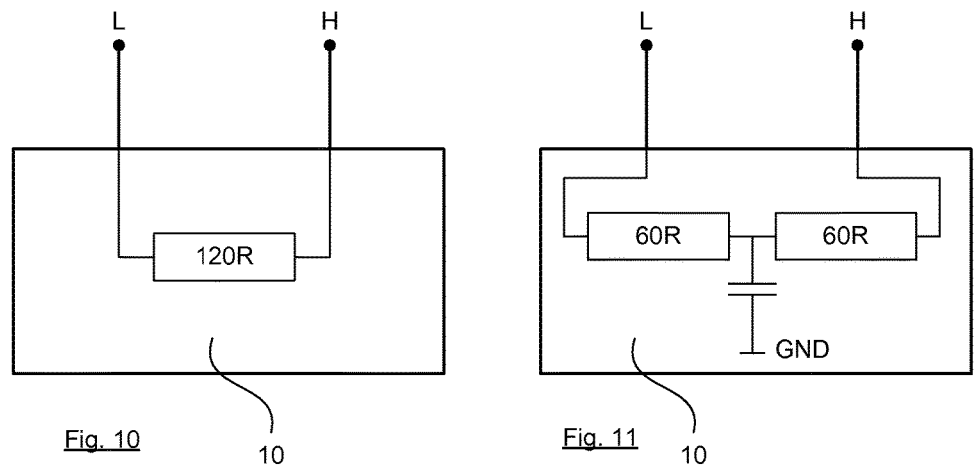
FIG. 10 shows a first example of a termination unit.
FIG. 11 shows a second example of a termination unit.

Termination unit 10, as illustrated in FIG. 10, can be formed by a single 120 Ω termination resistor, which for bus termination is switched between the two bus lines H, L. For this purpose, two termination switches S5_H, S5_L are provided, each of which contacts an end of the termination resistor and connects it to a bus line H, L. Basically only one termination switch is sufficient in the case of a single termination resistor.

An alternative embodiment of termination unit 10 is illustrated in FIG. 11. The unit has two series-connected resistors of up to 60 Ω each, which are connected to ground (GND) at their center tap via a capacitor. In this embodiment of termination unit 10, both termination switches S5_H, S5_L are necessary, which are activated together here.

Figure 12:
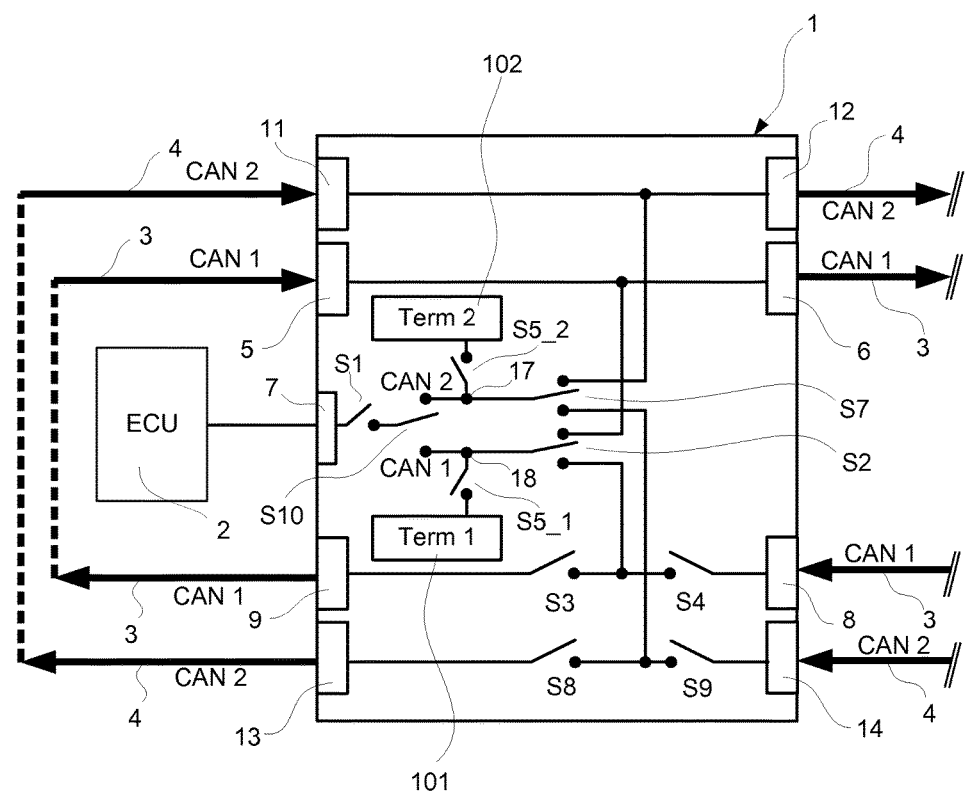
FIG. 12 shows a schematic block diagram of a second circuit arrangement of the invention for connection of two buses.

A second embodiment variant of circuit arrangement 1 of the invention is shown in a simplified illustration in FIG. 12. Here as well, for the sake of better clarity, a distinction is not made between the incoming and outgoing signal paths and also with respect to the multi-wire nature of the bus. According to the second embodiment variant, circuit arrangement 1 can be connected to a second CAN bus 4. To this end, it has a first bus input 11, a first bus output 12, a second bus input 14, and a second bus output 13 in such a way that second bus 4 can also be connected in a ring topology so that the first bus output is connected via second bus 4 to second bus input 14 and second bus output 13 via second bus 4 to first bus input 11. This can occur in each case directly or indirectly via another circuit unit, as is shown in FIGS. 2 to 7.

Circuit arrangement 1 has a bus changeover switch group S10, by means of which interface 7 can be switched optionally to first bus 3 or to second bus 4. Bus changeover switch group S10 is disposed in terms of circuitry between interface 7 and first switch group S2.

Because of the connection option to second bus 4, in circuit arrangement 1 all switch groups are doubled. Thus, there is a second switch group S7, which is constructed identical to first switch group S2. Interface 7 in the position, selecting second bus 4, of bus changeover switch group S10 can be connected via second switch group S7 optionally to first bus input 11 and first bus output 12 or second bus input 14 and second bus output 13 of second bus 4.

There is also a third and fourth disconnect switch group S8, S9 for second bus 4, as for first bus 3. They can sever the connection of second switch group S7 to second bus input 14 and to second bus output 13 of second bus 4, in order to change the quasi-ring topology of second bus 4 to a line topology.

Finally, circuit arrangement 1 also has two termination units 101, 102, a first termination unit 101 for the electrical termination of first bus 3, and a second termination unit 102 for the electrical termination of second bus 4. Each of the termination units 101, 102 can have the designs shown in FIGS. 10 and 11. At least one first termination switch S5_1, depending on the position of the mentioned first two disconnect switch groups S3, S4, switches first termination unit 101 to second bus input 8 and/or second bus output 9 of first bus 3, and at least one second termination switch S5_2, depending on the position of the third and fourth disconnect switch group S8, S9, switches second termination unit 102 to second bus input 14 and/or second bus output 13 of second bus 4.

First termination unit 101 is disposed at a node 18 between interface 7 and first switch group S2. Further, second termination unit 102 is disposed at a node 17 between interface 7 and second switch group S7. Depending on the position of first switch group S2, first termination unit 101 can thereby be connected either to first bus input 5 or second bus input 8 and/or second bus output 9 of first bus 3. In a corresponding way, depending on the position of second switch group S7, second termination unit 102 can be connected either to first bus input 11 or second bus input 14 and/or second bus output 13 of second bus 4.

Figure 13:
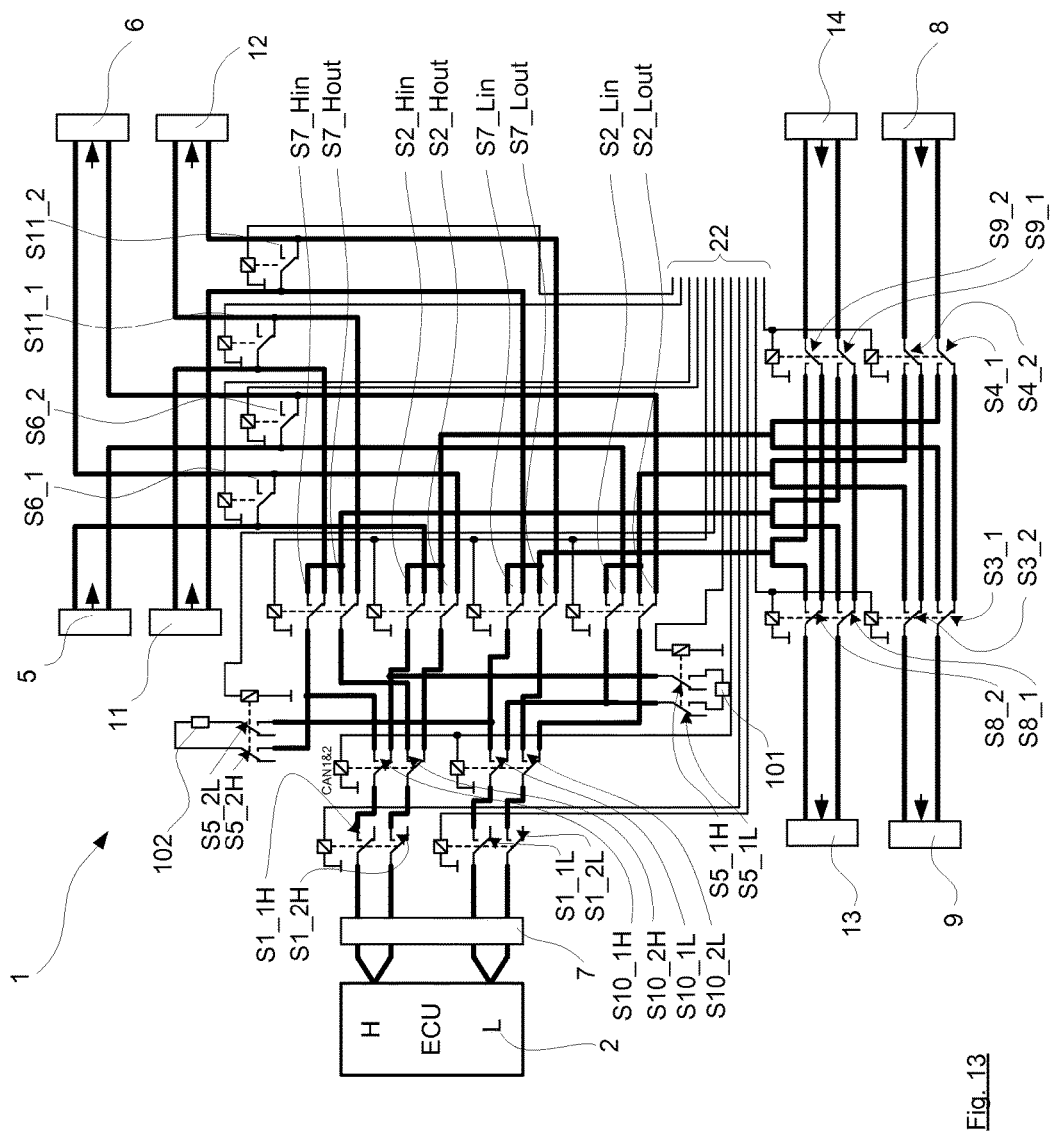
FIG. 13 shows a complete block diagram of the second circuit arrangement of the invention.

FIG. 13 shows a complete electrical block diagram of the second embodiment variant of the circuit arrangement according to the invention. In comparison with the illustration in FIG. 12, in FIG. 13 all signal paths (in/out) and both lines H, L of the particular CAN bus 3, 4 are taken into account. The switch groups thereby have a switch for each bus line or each signal path.

Thus, activation switch group S1 comprises four simple switches, namely, an activation switch S1_1H for the signal input high and activation switch S1_1L for the signal input low, as well as an activation switch S1_2H for the signal output high and an activation switch S1_2L for the signal output low. The switches S1_1H, S1_2H assigned to the same bus line H, L, on the one hand, and S1_1L, S1_2L, on the other, in each case form a jointly switched pair.

Bus changeover switch group S10 comprises four bus changeover switches configured as double-throw switches. A first bus changeover switch S10_1H connects optionally the high input of bus participant 2 to a high input of first bus 3 or to a high input of second bus 4. A second bus changeover switch S10_2H connects optionally the high output of bus participant 2 to a high output of first bus 3 or to a high output of second bus 4. A third bus changeover switch S10_1L connects optionally the low input of bus participant 2 to a low input of first bus 3 or to a low input of second bus 4. And a fourth changeover switch S10_2L connects optionally the low output of bus participant 2 to a low output of first bus 3 or to a low output of second bus 4. Here as well, switches S10_1H, S10_2H assigned to the same bus line H, L, on the one hand, and S10_1L, S10_2L, on the other, in each case form a jointly switched pair.

First switch group S2 also comprises four switches configured as double-throw switches, which connect optionally to first bus input 5 and first bus output 6 (top) or second bus input 8 and second bus output 9 of first bus 3. First switch group S2 comprises a first switch S2_Hin, in order to connect the high input of bus participant 2 to the corresponding high input of first bus 3 at the top bus connection (first bus input 5) or at the bottom bus connection (second bus input 8). It comprises further a second switch S2_Hout, in order to connect the high output of bus participant 2 to the corresponding high output of first bus 3 at the top bus connection (first bus output 6) or at the bottom bus connection (second bus output 9). It comprises a third switch S2_Lin in order to connect the low input of bus participant 2 to the corresponding low input of first bus 3 at the top bus connection (first bus input 5) or at the bottom bus connection (second bus input 8). And finally it comprises a fourth switch S2_Lout in order to connect the low output of bus participant 2 to the corresponding low output of first bus 3 at the top bus connection (first bus output 6) or at the bottom bus connection (second bus output 9). Here as well, switches S2_Hin, S2_Hout switching the same bus line H, L, on the one hand, and S2_Lin, S2_Lout, on the other, form a jointly switched switch pair.

Second switch group S7 has a structure identical to first switch group S2 and comprises double-throw switches S7_Hin, S7_Hout, S7_Lin, and S7_Lout, whereby the switches of second switch group S7 bring about the connection to second bus 4. Likewise, switches S7_Hin, S7_Hout switching the same bus line H, L, on the one hand, and S7_Lin, S7_Lout, on the other, in each case form a jointly switched switch pair.

The top bus connections, i.e., first bus input 5, 11 and first bus output 6, 12 of the first and second bus, in each case can be connected directly to one another by means of bridging switches S6_1, S6_2, S11_1, and S11_2 and the first and/or second switch group S2, S7 are bridged in this way. A first bridging switch S6_1 in the case of first bus 3 connects the high input to the high output, and a second bridging switch in the case of first bus 3 connects the low input to the low output. In a corresponding way, for second bus 4 a first bridging switch S11_1 is provided for connecting the high input to the high output and a second bridging switch S11_2 for connecting the low input to the low output. The bridging switches are all switchable separately from one another.

Two disconnect switch groups S3, S4 and S8, S9 are provided between the bottom bus connections, i.e., between second bus inputs 8, 14 and second bus outputs 9, 13 of first and second bus 3, 4. Each disconnect switch group has one disconnect switch for the high bus line and one disconnect switch for the low bus line. The disconnect switches are configured as double-throw switches and connect the corresponding bus connection either to one of the two switch groups S2, S7 or to a bypass line.

First disconnect switch group S3 comprises a first disconnect switch S3_1 for the high bus line and a second disconnect switch S3_2 for the low bus line of first bus 3. These are capable of severing the connection between second bus output 9 and first switch group S2. Second disconnect switch group S4 comprises a first disconnect switch S4_1 for the high bus line and a second disconnect switch S4_2 for the low bus line of first bus 3, which are able to sever the connection between second bus input 8 and first switch group S2. In a corresponding way, a third disconnect switch group S8 is provided for second bus 4 and comprises a first disconnect switch S8_1 for the high bus line and a second disconnect switch S8_2 for the low bus line of second bus 4. These are capable of severing the connection between second bus output 13 and second switch group S7. A fourth disconnect switch group S9 comprises a first disconnect switch S9_1 for the high bus line and a second disconnect switch S9_2 for the low bus line of second bus 4, which are able to sever the connection between second bus input 14 and second switch group S7.

The disconnect switches of each disconnect switch group S3, S4, S8, S9 are switched together. In addition, in the embodiment variant according to FIG. 13, the first and third disconnect switch groups S3, S8, on the one hand, and the second and fourth disconnect switch groups S4, S9 are activated by the same control signal, so that these also switch simultaneously.

Finally, circuit arrangement 1 comprises still another first termination unit 101 and a second termination unit 102. First termination unit 101 is switchable via termination switch S5_1H and S5_1L between the high and the low bus line of first bus 3. Depending on the switch position of switches S2_Hin and S2_Lin of first switch group S2, this occurs optionally to the top bus connections, here to first bus input 5, or to the bottom bus connections, here to second bus input 8 or to second bus output 9, depending on which disconnect switch group S3, S4 is open. This depends on the switch positions of the switches of the first and second disconnect switch groups S3, S4. In the case of an open second disconnect switch group S4 (S4_1, S4_2), a left termination of first bus 3 is configured. This means that first termination unit 101 is in contact with second bus output 9 of first bus 2 (CAN1) and there connects together the high and low bus line. In the case of an open first disconnect switch group S3 (S3_1, S3_2), a right termination is configured. This means that first termination unit 101 is in contact with second bus input 8 of first bus 3 and there connects together the high and low bus line.

Second termination unit 102 is switchable via termination switches S5_2H and S5_2L between the high and the low bus line of second bus 4 (CAN2). Depending on the switch position of switches S7_Hin and S7_Lin of second switch group S7, this occurs optionally to the top bus connections, here to first bus input 11, or to the bottom bus connections, here to second bus input 14 or to second bus output 13 depending on which disconnect switch group S8, S9 is open. This depends on the switch positions of the switches of the third and fourth disconnect switch groups S8, S9. In the case of an open fourth disconnect switch group S9 (S9_1, S9_2), a left termination of second bus 4 is configured. This means that second termination unit 102 is in contact with second bus output 13 of second bus 4. In the case of an open third disconnect switch group S8 (S8_1, S8_2), a right termination is configured. This means that second termination unit 102 is in contact with second bus input 14 of second bus 4.

The termination switches [S5_1H, S5_1L], [S5_2H, S5_2L] that belong to the same termination unit 101, 102 form a pair in each case and are actuated together. A relay is provided in each case for this purpose. The two relays can be activated independently of one another.

All other switches in the exemplary embodiment according to FIG. 13 are also actuated by means of relays. This means that all switches are formed by mechanical contact switches, which can be actuated electromechanically.

Activation switches S1_1H, S1_2H, and S1_1L, S1_2L, each of which is assigned to the same bus line high or low, are each actuated together by a relay. These relays as well can be activated independently of one another. In this way, the high input and output of the bus participant and its low input and output can be tested independently of one another.

Changeover switches S10_1H, S10_2H, and S10_1L, S10_2L, each of which is assigned to the same bus line high or low, are also each actuated together by a relay. The control lines of these relays are connected together, so that these relays can be activated simultaneously. This reduces the control costs. A separate controllability is not necessary here, because the high and low connections of the bus participant always must be connected to the same bus.

In the case of first switch group S2, the switches [S2_Hin, S2_Hout] and [S2_Lin, S2_Lout] that are connected to the same bus line high/low are also actuated together by a relay. The control lines of these relays are connected together, so that these relays can be activated simultaneously. This also applies to second switch group S7. Here, the switches [S7_Hin, S7_Hout] and [S7_Lin, S7_Lout] that are connected to the same bus line high/low are actuated together by a relay. The control lines of these relays are also connected together, so that these relays can be activated simultaneously. In addition, the control lines of the relays of the first and second switch groups S2, S7 are connected together. The control costs (lines, connections, signal processing) are also reduced thereby.

The bridging switches can all be actuated individually. Thus, each bridging switch is assigned its own relay that can be activated independently of one another.

Finally, each disconnect switch group S3, S4, S8, S9 has its own relay that actuates the two disconnect switches of the particular group. The disconnect switch groups that are responsible for a termination on the same side are switched together here, i.e., activated together. Their control lines are accordingly connected to one another. This applies to the first and third disconnect switch groups S3, S8, on the one hand, and the second and fourth disconnect switch groups S4, S9, on the other.

In total the embodiment variant in FIG. 13 therefore comprises 18 relays, which are activated via 12 independent control lines. These control lines are routed to a central connection 22 at which a plug contact is provided. The control lines can be attached to a control unit via this plug contact, for example, by means a flat ribbon cable.

To keep the stub line of the CAN bus as short as possible, the connection between input and output signals is made after interface 7 before the connection to control device 2. The ECU has only one connection each for the high signal and the low signal of the CAN bus.

Figure 14:
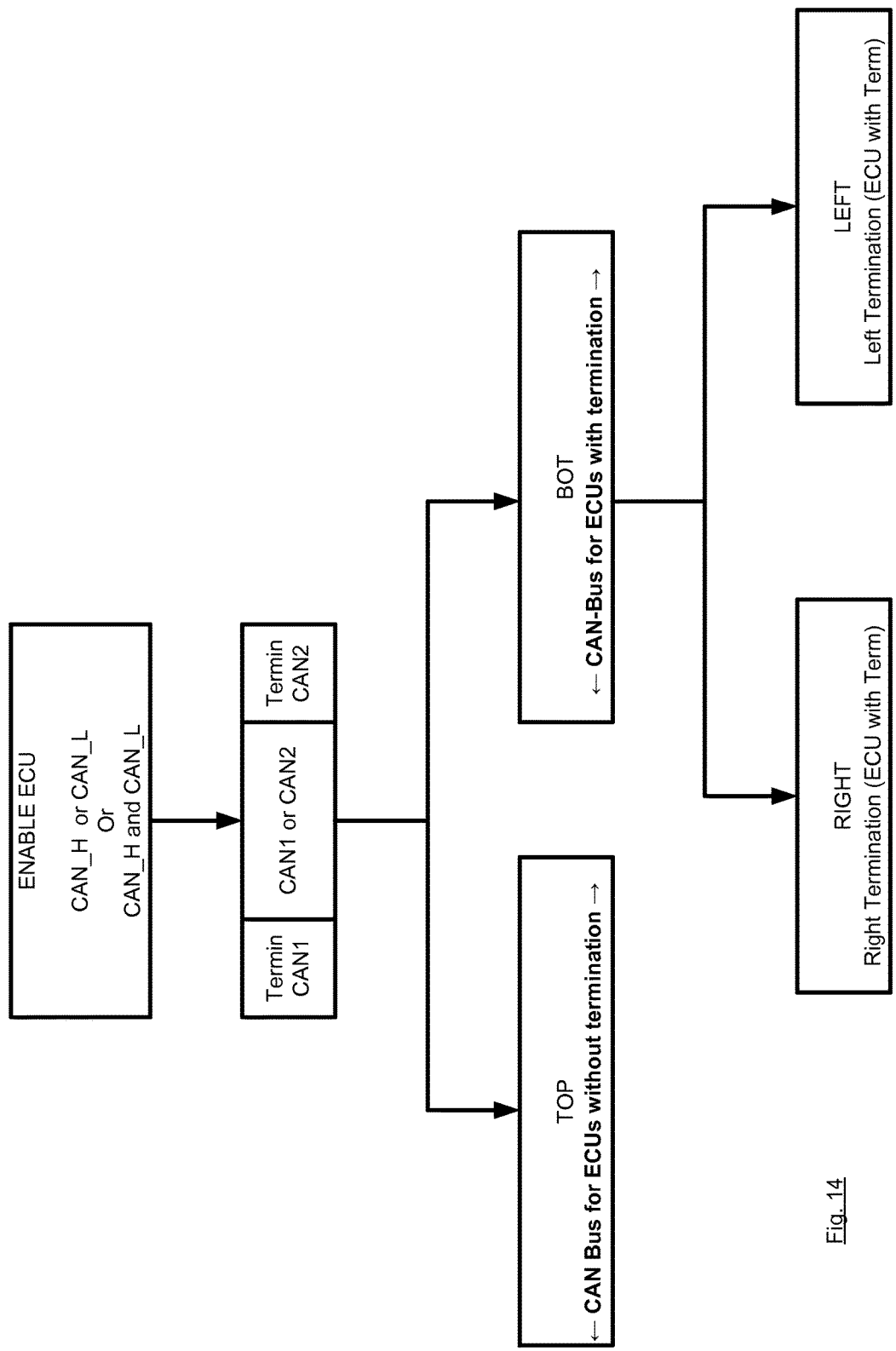
FIG. 14 shows a tree structure of the relay switching series.

FIG. 14 shows a tree structure of a possible relay switching series and possible switching states of the individual switches or switch groups, which can be used for attaching bus participant 2 to the bus.

At the beginning of the tree structure is the selection whether the bus participant is to be connected only to the high connection (CAN_H) or only to the low connection (CAN_L) or to both the high (CAN_H) and low connection (CAN_L). This selection occurs by the activation switches.

Then the selection is made whether the bus participant is to be connected to the first or second bus (CAN1 or CAN2). This occurs via the bus changeover switch.

It is then selected whether circuit arrangement 1 of the invention is to terminate one of the buses CAN1, CAN2. This occurs if a control device connected to the bus end has no internal termination or the bus is to be terminated without a connected control device. Further, it is also possible that both buses CAN1, CAN2 are terminated. Instead of a termination, the first and/or the second bus can also be looped through circuit arrangement 1 by means of the bridging switches.

For each of the buses, the bus participant can then be connected to the first bus input/first bus output, designated by TOP in FIG. 14, or to the second bus input/second bus output, designated by BOT in FIG. 14. This occurs by means of first switch group S2 in the case of the selection of the first bus (CAN1) and with second switch group S7 in the case of the selection of the second bus (CAN2). The selection of the connection with the first bus input and first bus output is provided for bus participants that are to be connected in the middle to the bus, i.e., are not to terminate the bus. In contrast, the setting bottom, i.e., the selection of the connection to the second bus input and second bus output, is provided for bus participants that are to terminate the bus.

It has to be selected only for the selection of the connection to the second bus input and second bus output whether a right-sided or a left-sided termination is to occur; i.e., the termination unit is to be connected to the second bus input or to the second bus output. This occurs via the disconnect switches.

Figure 15:
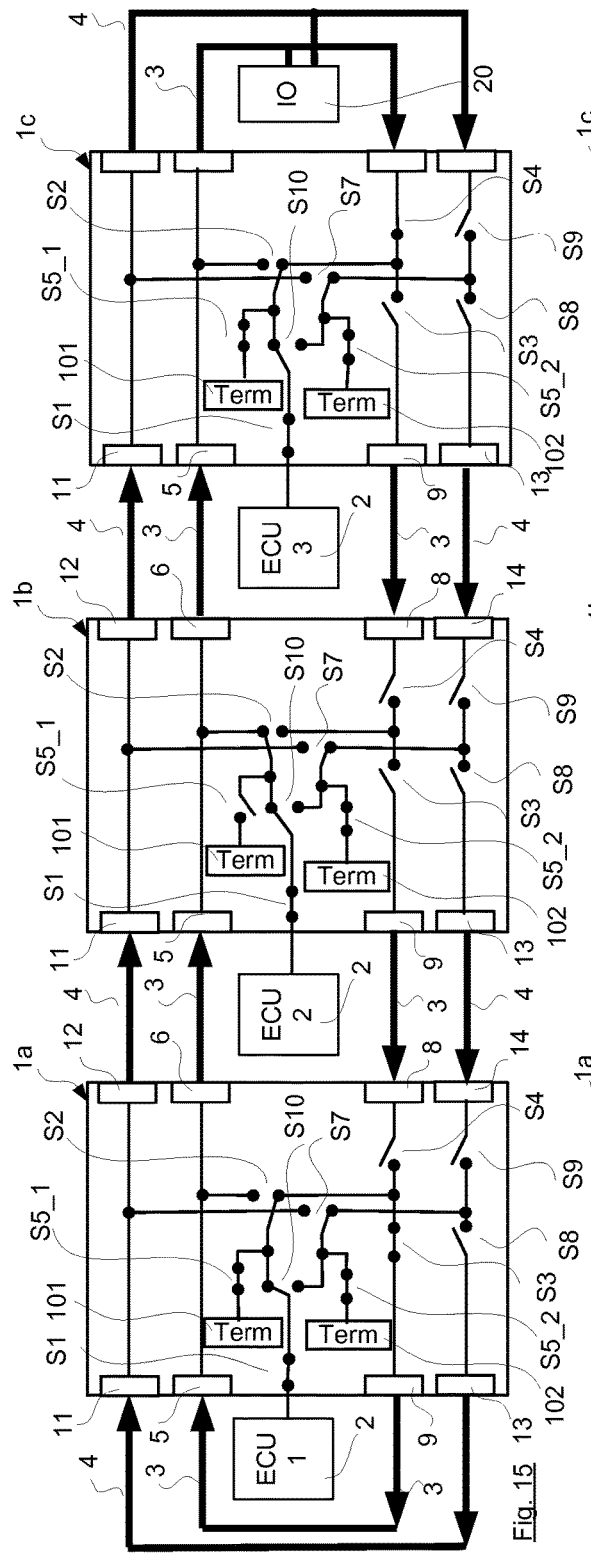
FIG. 15 shows an example of a fifth interconnection type of the three circuit arrangements according to FIG. 2.

In FIG. 15 first circuit arrangement 1*a* for the first bus is configured as left-terminating and connects first bus participant 2 (ECU1) to first bus 3. Second circuit arrangement 1*b* connects its bus participant 2 (ECU2) in the middle to first bus 3 without termination and third circuit arrangement 1*c* is configured as right-terminating for first bus 3 and connects its bus participant 2 (ECU3) to first bus 3. In this example, the position of third disconnect switch group S3 and fourth disconnect switch group S4 is not important in all three circuit arrangements 1*a*, 1*b*, 1*c*; they are open by way of example in FIG. 15. In all three circuit arrangements 1*a*, 1*b*, 1*c*, bus changeover switch group S10 connects activation switch group S1 to first switch group S2. Second switch group S7 of all three circuit arrangements 1*a*, 1*b*, 1*c* is connected downward here (bottom); however, this has no effect on the circuit. Second termination switch S5_2 is closed here in all three circuit arrangements and connects in each case second termination unit 102 to second switch group S7.

This means that in the case of first circuit arrangement 1*a*, first disconnect switch group S3 is closed and first switch group S2 is connected downward (bottom), i.e., is switched to second bus output 9, and second disconnect switch group S4 is open. First bus participant 2 (ECU1) has no internal termination, so that first termination switch S5_1 is also closed and first termination unit 101 is connected to first bus 3. Activation switch group S1 is closed here. Third disconnect switch group S8 and fourth disconnect switch group S9 are open here.

In the case of second circuit arrangement 1b, first switch group S2 is connected upward (top) and activation switch group S1 is closed, so that second bus participant ECU2 is switched between first bus input 5 and first bus output 6. First termination switch S5_1 because of the arrangement of the bus participant is open in the middle of the bus.

Third circuit arrangement 1c is configured substantially identical to first circuit arrangement 1a, whereby here however first disconnect switch group S3 is open and second disconnect switch group S4 is closed in order to realize a right-sided termination.

Simulator unit 20 (IO) is connected fixedly to first bus 3 and second bus 4.

Figure 16:
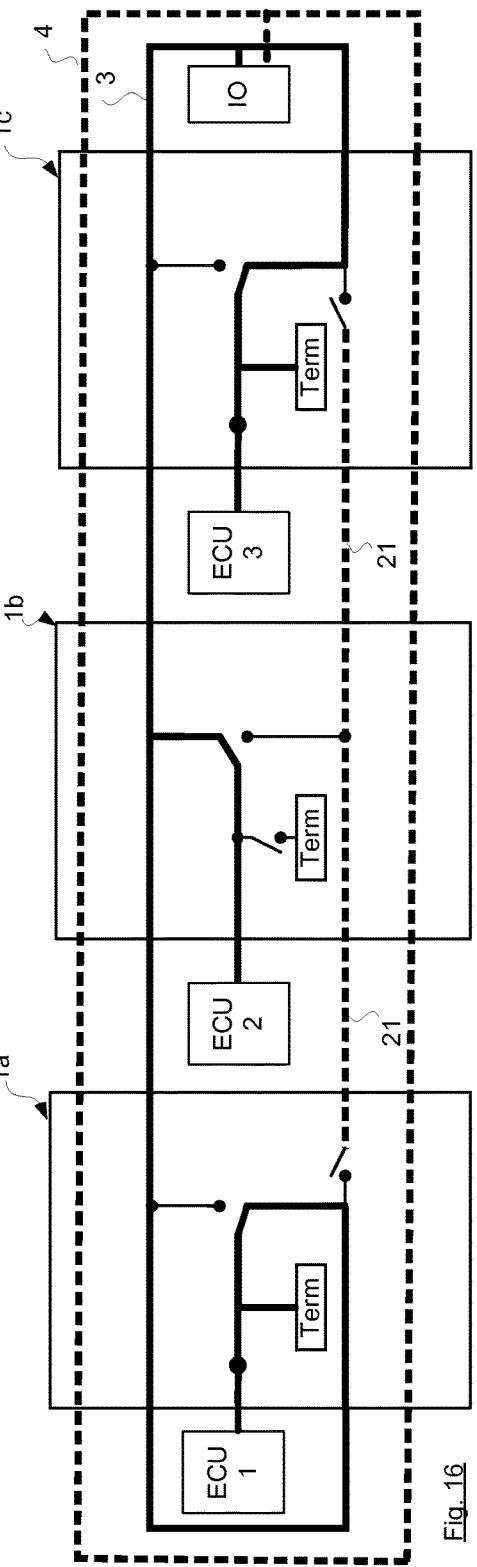
FIG. 16 shows a schematic diagram of the bus structure of the fifth example according to FIG. 15.

The bus structure arising due to the particular configuration of the individual circuit arrangements 1a, 1b, 1c is emphasized in FIG. 16. It can be seen that the "quasi-ring topology" of bus 3 is separated and there is a dead-ended line section 21, which is shown by the dashed line in FIG. 16, between the first and the third circuit arrangement. Only simulator unit 20 is connected to second bus 4; therefore, the entire second bus 4 is a dead-ended line section 21 and is shown by the dashed line in FIG. 16.

Figures 17, 18:
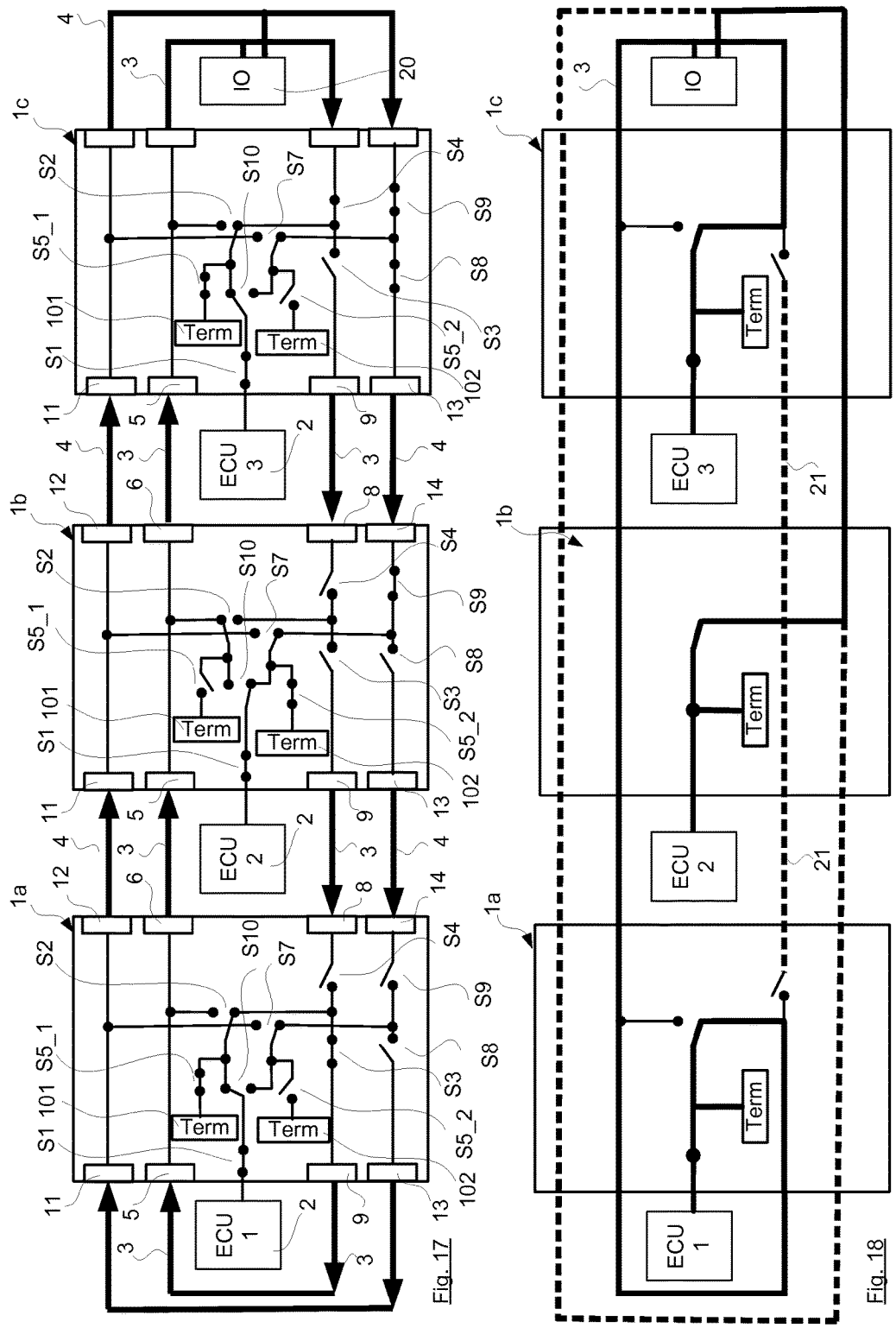
FIG. 17 shows an example of a sixth interconnection type of the three circuit arrangements according to FIG. 2.
FIG. 18 shows a schematic diagram of the bus structure of the sixth example according to FIG. 17.

In FIG. 17 first circuit arrangement 1a for first bus 3 is configured as left-terminating and connects first bus participant 2 (ECU1) to first bus 3. Second circuit arrangement 1b is configured right-terminating for the second bus and connects its bus participant 2 (ECU2) to second bus 4. Third circuit arrangement 1c is configured right-terminating for first bus 3 and connects it bus participant 2 (ECU3) to first bus 3.

This means that in the case of first circuit arrangement 1a, first disconnect switch group S3 is closed and first switch group S2 is connected downward (bottom), i.e., is switched to second bus output 9. First bus participant 2 (ECU1) has no internal termination, so that first termination switch S5_1 is closed as well. Activation switch group S1 is closed here. Bus changeover switch group S10 connects activation switch group S1 to first switch group S2. Second switch group S7 is connected downward here (bottom). Second termination switch S5_2 is open here and connects second termination unit 102 not to second switch group S7. The position of the third and the fourth disconnect switch groups S8, S9 is not important here; they are open by way of example in FIG. 17.

In the case of second circuit arrangement 1b, second switch group S7 is connected downward (bottom) and activation switch group S1 is closed, so that second bus participant 2 (ECU2) is switched between second bus input 14 and second bus output 13 of second bus 4. Second termination switch S5_2 is closed and connects second termination unit 102 to the second bus. Third disconnect switch group S8 is open and fourth disconnect switch group S9 is closed, so that a right-sided termination of second bus 4 results. Bus changeover switch group S10 connects activation switch group S1 to second switch group S7. First switch group S2 is connected upward here (top). The position of the first and second disconnect switch groups S3, S4 is not important here; they are open by way of example in FIG. 17.

Third circuit arrangement 1c is configured substantially identical to first circuit arrangement 1a, whereby here however first disconnect switch group S3 is open and second disconnect switch group S4 is closed in order to realize a right-sided termination of the first bus. The third and fourth disconnect switch groups 8, 9 are closed to enable connecting second circuit arrangement 1b to simulator unit 20 (IO) via second bus 4.

Simulator unit 20 is fixedly connected to first bus 3 and second bus 4. The simulator unit terminates second bus 4.

The bus structure arising due to the particular configuration of the individual circuit arrangements 1a, 1b, 1c is emphasized in FIG. 18. It can be seen that the "quasi-ring topology" of bus 3 is separated and there is a dead-ended line section 21, which is shown by the dashed line in FIG. 18, between the first and third circuit arrangement. Simulator unit 20 and second circuit arrangement 1b are connected by second bus 4.

All shown embodiment variants are based on a system for the functional testing of bus participants ECU1, ECU2, ECU3 on a bus 3, 4 (CAN1, CAN2) in a simulation environment. The system comprises a plurality of circuit arrangements 1a, 1b, 1c and a bus 3, 4, particularly a CAN bus, whereby the bus participants ECU2, ECU3 can each be connected by means of one of the circuit arrangements 1a, 1b, 1c to bus 3, 4. Further, the system comprises a simulator unit 20 for simulating control signals on the bus. Each of the circuit arrangements 1a, 1b, 1c has a first and a second bus input 5, 8 and a first and a second bus output 6, 9. Further, bus 3, 4 connects the circuit arrangements in a ring topology in such a way that each first bus output 6 of one of the circuit arrangements 1a, 1b, 1c is connected either to first bus input 5 of the next circuit arrangement 1b, 1c or to second bus input 8 of its own circuit arrangement 1c, and each second bus output 9 of one of the circuit arrangements 1a, 1b, 1c is connected either to second bus input 8 of the next circuit arrangement 1a, 1b or to first bus input 5 of its own circuit arrangement 1a, whereby bus 3, 4 in each of the circuit arrangements 1a, 1b, 1c can be separated to obtain a line topology and each circuit arrangement 1a, 1b, 1c can be configured as bus-terminating at one of the bus inputs 5, 8 or bus outputs 6, 9.

In particular in regard to the embodiment variants in FIGS. 15 to 18, the system comprises in addition a second bus 4 (CAN2), which connects the circuit arrangements 1a, 1b, 1c (ECU1, ECU2, ECU3) in same way as first bus 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit arrangement for connecting a bus participant to at least one bus, the circuit arrangement comprising:
   an interface for connecting the bus participant to the circuit arrangement;
   a first bus input and a first bus output, between which the bus participant is switchable via the interface; and
   a second bus input and a second bus output for connecting the first bus to the circuit arrangement in a ring topology such that the first bus output is connected at least indirectly to the second bus input via the first bus and the second bus output is connected at least indirectly to the first bus input via the first bus,
   wherein the first bus in the circuit arrangement is configured to be separated to obtain a line topology, wherein the circuit arrangement is configured as bus-terminating at one of the bus inputs or bus outputs, and
wherein the circuit arrangement is adapted to be connected to a second bus and further comprises a bus changeover switch group via which the interface is selectively connectable to the first bus or to the second bus.

2. The circuit arrangement according to claim 1, wherein the interface is connectable via a first switch group to the first bus input and the first bus output or the second bus input and the second bus output, and wherein the connection from the first switch group to the second bus input and to the second bus output is severable by a disconnect switch group in order to change the ring topology of the first bus to a line topology.

3. The circuit arrangement according to claim 2, further comprising a termination unit for the electrical termination of the first bus, which, depending on a position of the disconnect switch group, is connectable to the second bus input and/or the second bus output via at least one termination switch.

4. The circuit arrangement according to claim 2, wherein the disconnect switch groups comprise double-throw switches and selectively connect the second bus input and/or the second bus output to the first switch group or to a bypass line.

5. The circuit arrangement according to claim 1, further comprising a bridging switch group for direct connection of the first bus input to the first bus output.

6. The circuit arrangement according to claim 1, wherein the interface is connectable to the first switch group via an activation switch group for coupling and decoupling the bus participant to or from the first bus.

7. The circuit arrangement according to claim 6, wherein the activation switch group has a switch pair for each line of the first bus, and wherein the switch pairs are switchable independently of one another.

8. The circuit arrangement according to claim 1, wherein the second bus comprises a first bus input, a first bus output, a second bus input, and a second bus output such that the second bus is placeable in a ring topology such that the first bus output is connected at least indirectly to the second bus input via the second bus and the second bus output is connected at least indirectly to the first bus input via the second bus.

9. The circuit arrangement according to claim 1, further comprising a second switch group via which the interface in the position selecting the second bus of the bus changeover switch group is selectively connectable to the first bus input and the first bus output or to the second bus input and the second bus output of the second bus.

10. The circuit arrangement according to claim 9, wherein the connection from the second switch group to the second bus input and to the second bus output of the second bus is adapted to be severed in each case by a disconnect switch group in order to change the ring topology of the second bus to a line topology, and further comprising a second termination unit for the electrical termination of the second bus, which, depending on the position of the disconnect switch groups, is connectable to the second bus input or the second bus output via at least one termination switch.

11. The circuit arrangement according to claim 10, wherein the disconnect switch groups each comprise double-throw switches and the second bus input and/or connect the second bus output of the second bus selectively to the second switch group or to another bypass line.

12. The circuit arrangement according to claim 1, further comprising a bridging switch group for the direct connection of the first bus input to the first bus output of the first bus and/or a bridging switch group for the direct connection of the first bus input to a first bus output of the second bus.

13. The circuit arrangement according to claim 1, wherein the first and/or the second bus are realized as dual-wire, and wherein a first switch group and/or a second switch group and a disconnect switch groups each comprise a switch for each of the two bus lines.

14. The circuit arrangement according to claim 3, wherein the termination unit and/or a second termination unit are formed by a termination resistor, which is switchable via a respective termination switch between the lines of a respective bus.

15. The circuit arrangement according to claim 3, wherein the termination unit and/or a second termination unit are formed by two termination resistors, which together are connected to a ground via a capacitor, and wherein the one termination resistor is connectable to one of the first bus lines via a termination switch and the other termination resistor to the other bus line via another termination switch.

16. A system for the functional testing of bus participants on a bus in a simulation environment, the system comprising:
a plurality of circuit arrangements; and
a first bus, wherein the bus participants are each connectable to the first bus via an interface in each of the circuit arrangements; and
a simulator unit for simulating control signals on the first bus,
wherein each of the circuit arrangements has a first and a second bus input and a first and a second bus output and the first bus connects the circuit arrangements in a ring topology such that each first bus output of one of the circuit arrangements is connectable either to the first bus input of the next circuit arrangement or to the second bus input of its own circuit arrangement,
wherein each second bus output of one of the circuit arrangements is connectable either to the second bus input of the next circuit arrangement or to the first bus input of its own circuit arrangement, and
wherein the first bus in each of the circuit arrangements is separated to obtain a line topology and each circuit arrangement is configured as bus-terminating at one of the bus inputs or bus outputs of the first bus, and
wherein the interface is a separate contact from the first bus input, the first bus output, the second bus input, and the second bus output.

17. The system according to claim 16, wherein a second bus connects to the circuit arrangements in the same way as the first bus.

18. The system according to claim 16, wherein each of the circuit arrangements comprises:
the interface for connecting the bus participant to the circuit arrangement;
a first bus input and a first bus output, between which the bus participant is switchable via the interface; and
a second bus input and a second bus output for connecting the first bus to the circuit arrangement in a ring topology such that the first bus output is connected at least indirectly to the second bus input via the first bus and the second bus output is connected at least indirectly to the first bus input via the first bus,
wherein the first bus in the circuit arrangement is configured to be separated to obtain a line topology, and wherein the circuit arrangement is configured as bus-terminating at one of the bus inputs or bus outputs.

19. The circuit arrangement according to claim 1, wherein the first bus is a CAN bus.

20. A circuit arrangement for connecting a bus participant to at least one bus, the circuit arrangement comprising:
an interface for connecting the bus participant to the circuit arrangement;
a first bus input and a first bus output, between which the bus participant is switchable via the interface;
a second bus input and a second bus output for connecting the bus to the circuit arrangement in a ring topology such that the first bus output is connected at least indirectly to the second bus input via the bus and the second bus output is connected at least indirectly to the first bus input via the bus; and
a termination unit for the electrical termination of the bus, which, depending on a position of the disconnect switch group, is connectable to the second bus input and/or the second bus output via at least one termination switch,
wherein the bus in the circuit arrangement is configured to be separated to obtain a line topology,
wherein the circuit arrangement is configured as bus-terminating at one of the bus inputs or bus outputs, and
wherein the termination unit and/or a second termination unit are formed by a termination resistor, which is switchable via a respective termination switch between the lines of the respective bus.

21. The circuit arrangement according to claim 1, wherein the interface is a separate contact from the first bus input, the first bus output, the second bus input, and the second bus output.

22. The circuit arrangement according to claim 1, wherein the bus participant is not directly connected to the first bus input, the first bus output, the second bus input, and the second bus output.

23. The circuit arrangement according to claim 1, wherein the second bus is a CAN bus.

* * * * *